(12) United States Patent
Ratnam et al.

(10) Patent No.: US 12,407,593 B2
(45) Date of Patent: Sep. 2, 2025

(54) Wi-Fi BASED FINE RANGING USING CARRIER PHASE INFORMATION

(71) Applicant: Samsung Electronics Co., Ltd., Suwon-si (KR)

(72) Inventors: Vishnu Vardhan Ratnam, Plano, TX (US); Bilal Sadiq, Plano, TX (US); Hao Chen, Allen, TX (US); Abhishek Sehgal, Frisco, TX (US); Boon Loong Ng, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 18/486,906

(22) Filed: Oct. 13, 2023

(65) Prior Publication Data

US 2024/0223484 A1  Jul. 4, 2024

Related U.S. Application Data

(60) Provisional application No. 63/434,433, filed on Dec. 21, 2022.

(51) Int. Cl.
*H04L 43/0864* (2022.01)
*H04L 25/02* (2006.01)
(Continued)

(52) U.S. Cl.
CPC ...... *H04L 43/0864* (2013.01); *H04L 25/0202* (2013.01); *H04L 27/2659* (2013.01); *H04L 27/266* (2013.01); *H04L 43/0841* (2013.01)

(58) Field of Classification Search
CPC ............. H04L 43/0864; H04L 25/0202; H04L 27/2659; H04L 27/266; H04L 43/0841
(Continued)

(56) References Cited

U.S. PATENT DOCUMENTS

| 10,536,805 B2 | 1/2020 | Nallampatti Ekambaram et al. |
| 11,683,779 B2 | 6/2023 | Seth et al. |

(Continued)

FOREIGN PATENT DOCUMENTS

| CN | 205810346 U | * | 12/2016 | |
| CN | 106162858 B | * | 8/2019 | .......... H04W 56/001 |

(Continued)

OTHER PUBLICATIONS

IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

(Continued)

*Primary Examiner* — David R Lazaro
*Assistant Examiner* — Mariegeorges A Henry

(57) ABSTRACT

A method includes obtaining Wi-Fi channel state information (CSI) parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error. The method also includes determining a round trip time (RTT) estimate or a relative change in the RTT estimate as a function of the CSI parameters. The method further includes estimating a range between the anchor and the target device as a function of the RTT estimate, or estimating a change in the range between the anchor and the target device as a function of the relative change in the RTT estimate.

20 Claims, 14 Drawing Sheets

(51) Int. Cl.
  *H04L 27/26* (2006.01)
  *H04L 43/0829* (2022.01)
(58) Field of Classification Search
  USPC .......................................................... 709/224
  See application file for complete search history.

(56) References Cited

U.S. PATENT DOCUMENTS

| | | | |
|---|---|---|---|
| 2019/0053124 A1* | 2/2019 | Bitra | H04W 76/10 |
| 2019/0158335 A1* | 5/2019 | Stanciu | H04L 27/2657 |
| 2019/0190806 A1* | 6/2019 | Bhushan | H04W 72/20 |
| 2020/0137715 A1 | 4/2020 | Edge et al. | |
| 2020/0229124 A1 | 7/2020 | Soriaga et al. | |
| 2020/0305113 A1* | 9/2020 | Seth | H04L 45/121 |
| 2022/0078644 A1 | 3/2022 | Chennichetty et al. | |
| 2022/0299629 A1 | 9/2022 | Liu et al. | |
| 2022/0394505 A1* | 12/2022 | Franke | H04W 24/10 |
| 2023/0071554 A1 | 3/2023 | Zhang et al. | |
| 2023/0072377 A1 | 3/2023 | Leroy et al. | |

FOREIGN PATENT DOCUMENTS

| | | | | |
|---|---|---|---|---|
| CN | 114785435 A | * | 7/2022 | |
| DE | 102022200588 A1 | * | 11/2022 | ........ H04W 28/0289 |
| KR | 20220009460 A | * | 1/2022 | |

OTHER PUBLICATIONS

Sourour, E., et al., "Frequency offset estimation and correction in the IEEE 802.11a WLAN", IEEE 60th Vehicular Technology Conference, 2004, 5 pages.

Obeidat, H., et al., "A Review of Indoor Localization Techniques and Wireless Technologies", Wireless Personal Communications (2021) 119:289-327, 39 pages.

Vasisht, D., et al., "Decimeter-Level Localization with a Single WiFi Access Point", Proceedings of the 13th USENIX Symposium on Networked Systems Design and Implementation (NSDI '16), Santa Clara, CA, USA, Mar. 16-18, 2016, 15 pages.

Raissinia, A., et al., "Draft PAR for 320 MHz Positioning TGbk Project", IEEE P802.11 Wireless LANs, IEEE 802.11-22/1325r5, Aug. 2022, 3 pages.

IEEE P802.11azTM/D5.0 May 2022, Draft Standard for Information Technology—Telecommunications and information exchange between systems Local and metropolitan area networks—Specific requirements "Part 11: Wireless LAN Medium Access Control (MAC) and Physical Layer (PHY) Specifications, Amendment 4: Enhancements for positioning", 287 p.

International Search Report and Written Opinion issued Feb. 13, 2024 regarding International Application No. PCT/KR2023/017862, 10 pages.

Segev et al., "IEEE 802.11bk CSD", IEEE 802.11-22/1353r3, Nov. 2022, 5 pages.

* cited by examiner

Wi-Fi BASED FINE RANGING USING CARRIER PHASE INFORMATION

This application claims priority under 35 U.S.C. § 119(e) to U.S. Provisional Patent Application No. 63/434,433, filed on Dec. 21, 2022, which is hereby incorporated by reference in its entirety.

TECHNICAL FIELD

This disclosure relates generally to wireless communications systems. Embodiments of this disclosure relate to methods and apparatuses for Wi-Fi based fine ranging by using carrier phase information.

BACKGROUND

Various positioning and localization techniques have grown in popularity over the last decade in parallel with the growth in the number of personal wireless devices and the growth in wireless infrastructure. While the use cases are plentiful and include smart homes and buildings, surveillance, disaster management, industry and healthcare, they all require wide availability and good accuracy. A key step of most positioning/localization solutions is ranging which involves identification of the distance (or a difference in distances) of the target device from a set of anchor devices whose locations are known.

SUMMARY

Embodiments of the present disclosure provide methods and apparatuses for Wi-Fi based fine ranging by using carrier phase information.

In one embodiment, a method includes obtaining Wi-Fi channel state information (CSI) parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error. The method also includes determining a round trip time (RTT) estimate or a relative change in the RTT estimate as a function of the CSI parameters. The method further includes estimating a range between the anchor and the target device as a function of the RTT estimate, or estimating a change in the range between the anchor and the target device as a function of the relative change in the RTT estimate.

In another embodiment, a device includes a transceiver and a processor operably connected to the transceiver. The processor is configured to: obtain Wi-Fi CSI parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error; determine a RTT estimate or a relative change in the RTT estimate as a function of the CSI parameters; and estimate a range between the anchor and the target device as a function of the RTT estimate, or estimate a change in the range between the anchor and the target device as a function of the relative change in the RTT estimate.

In another embodiment, a non-transitory computer readable medium includes program code that, when executed by a processor of a device, causes the device to: obtain Wi-Fi CSI parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error; determine a RTT estimate or a relative change in the RTT estimate as a function of the CSI parameters; and estimate a range between the anchor and the target device as a function of the RTT estimate, or estimate a change in the range between the anchor and the target device as a function of the relative change in the RTT estimate.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
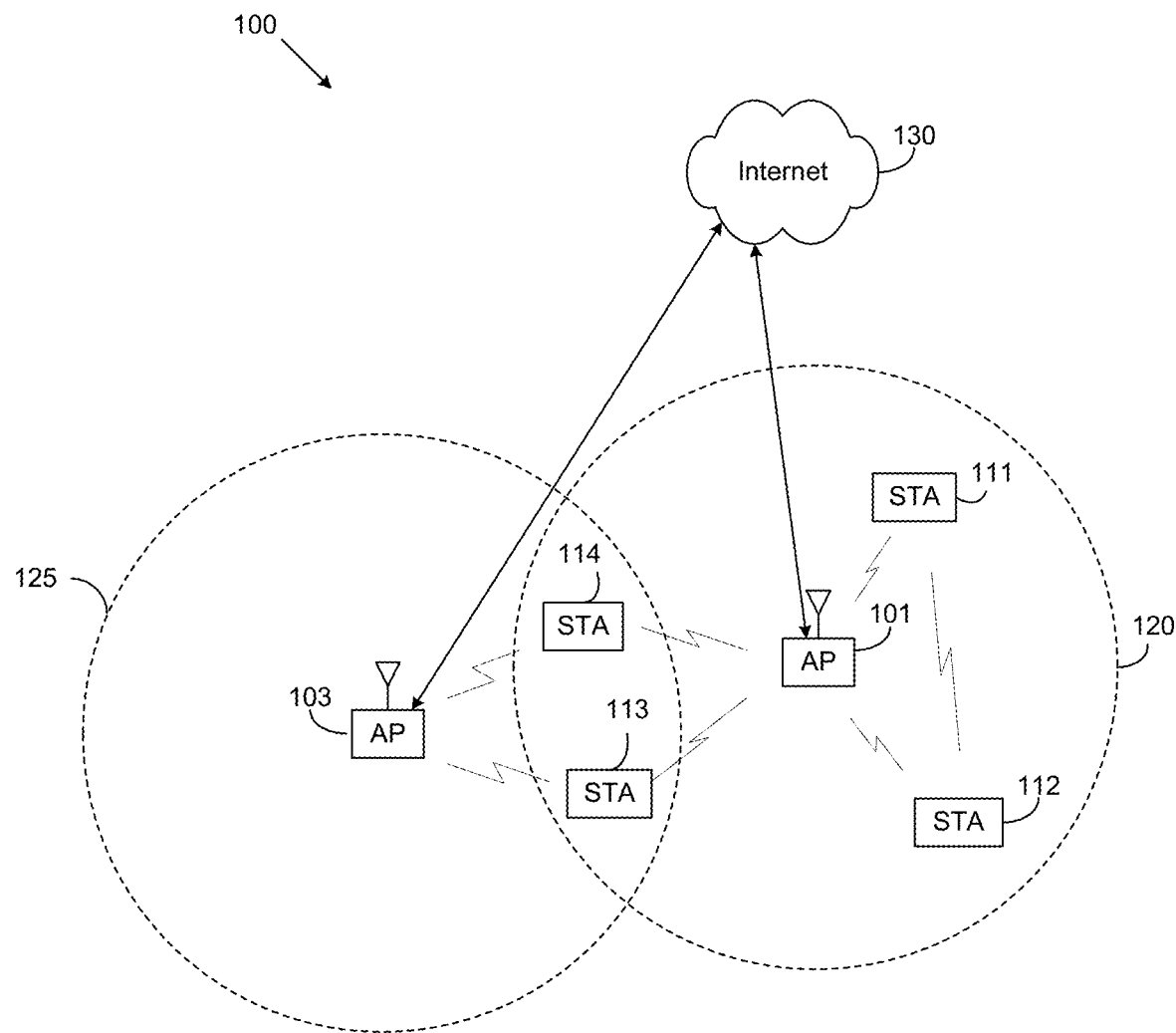
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN (wireless local area network) communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming to enable Wi-Fi based fine ranging by exploiting carrier phase information. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broadband access to the network 130. Further, the APs 101 and/or 103 could provide access to other or additional external networks, such as external telephone networks or other types of data networks.

Figure 2A:
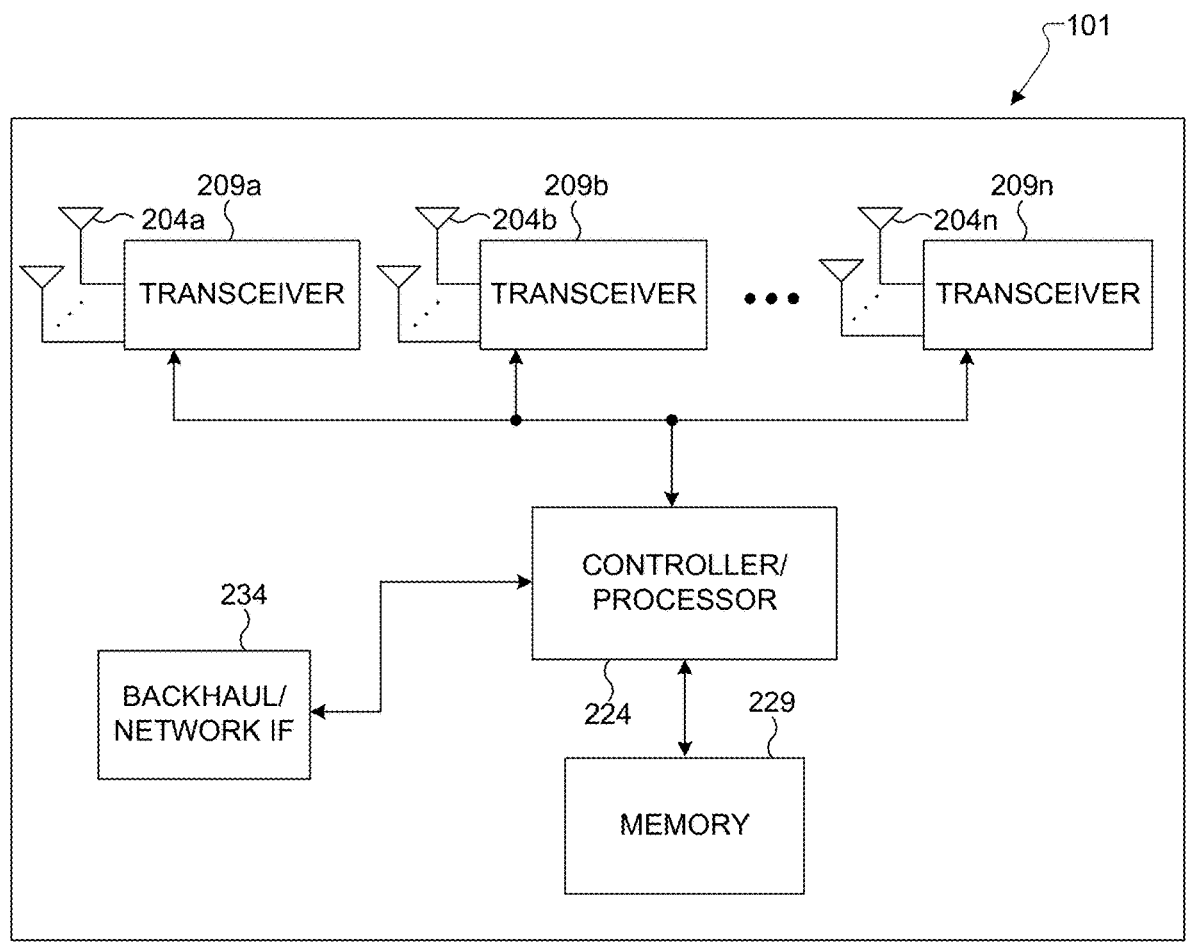
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n and multiple transceivers 209a-209n. The AP 101 also includes a controller/processor 224, a memory 229, and a backhaul or network interface 234. The transceivers 209a-209n receive, from the antennas 204a-204n, incoming radio frequency (RF) signals, such as signals transmitted by STAs 111-114 in the network 100. The transceivers 209a-209n down-convert the incoming RF signals to generate IF or baseband signals. The IF or baseband signals are processed by receive (RX) processing circuitry in the transceivers 209a-209n and/or controller/processor 224, which generates processed baseband signals by filtering, decoding, and/or digitizing the baseband or IF signals. The controller/processor 224 may further process the baseband signals.

Transmit (TX) processing circuitry in the transceivers 209a-209n and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209a-209n up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the transceivers 209a-209n in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including enabling Wi-Fi based fine ranging by exploiting carrier phase information. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for Wi-Fi based fine ranging by exploiting carrier phase information. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
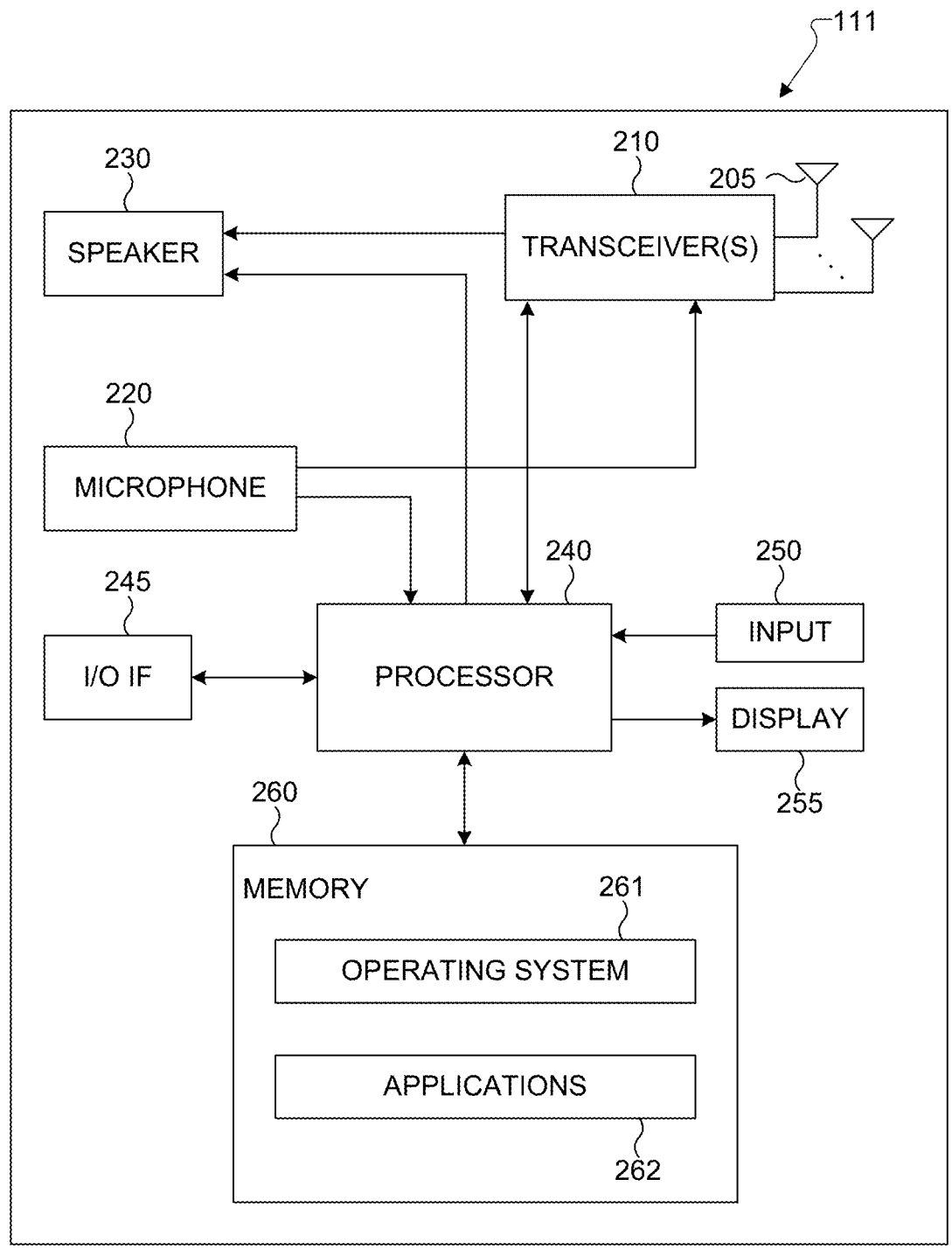
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to enable Wi-Fi based fine ranging by exploiting carrier phase information. In some embodiments, the processor 240 includes at least one microprocessor or microcontroller.

The processor 240 is also capable of executing other processes and programs resident in the memory 260, such as operations for enabling Wi-Fi based fine ranging by exploiting carrier phase information. The processor 240 can move data into or out of the memory 260 as required by an executing process. In some embodiments, the processor 240 is configured to execute a plurality of applications 262, such as applications to enable Wi-Fi based fine ranging by exploiting carrier phase information. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed earlier, various positioning and localization techniques have grown in popularity over the last decade in parallel with the growth in the number of personal wireless devices and the growth in wireless infrastructure. While the use cases are plentiful and include smart homes and buildings, surveillance, disaster management, industry and healthcare, they all require wide availability and good accuracy. A key step of most positioning/localization solutions is ranging which involves identification of the distance (or a difference in distances) of the target device from a set of anchor devices whose locations are known. Correspondingly several ranging techniques have been proposed in Ultra-wide band (UWB), Lidar and Wi-Fi. In fact, WiFi standards like 802.11mc and 802.11az have been specifically tailored for enabling accurate WiFi-based ranging, such as via the Fine Timing Measurement (FTM) protocol. FTM is a wireless network management procedure that allows a Wi-Fi station (STA) to accurately measure the distance (or range) from other STAs (e.g., an access point) by measuring the round-trip time (RTT) between the two.

An STA wanting to localize itself, known as the initiating STA, with respect to other STAs, known as responding STAs, schedules an FTM session during which the STAs exchange messages and measurements. The FTM session consists of three phases: negotiation, measurement exchange, and termination.

The measurement phase consists of one or more bursts, and each burst consists of one or more (Fine Time) measurements. The duration of a burst and the number of measurements therein are defined by the parameters burst duration and FTMs per burst. The bursts are separated by an interval defined by the parameter burst duration. In the negotiation phase, the initiating STA negotiates with the responding STA key parameters, such as frame format and bandwidth, number of bursts, burst duration, the burst period, and the number of measurements per burst.

Figure 3:
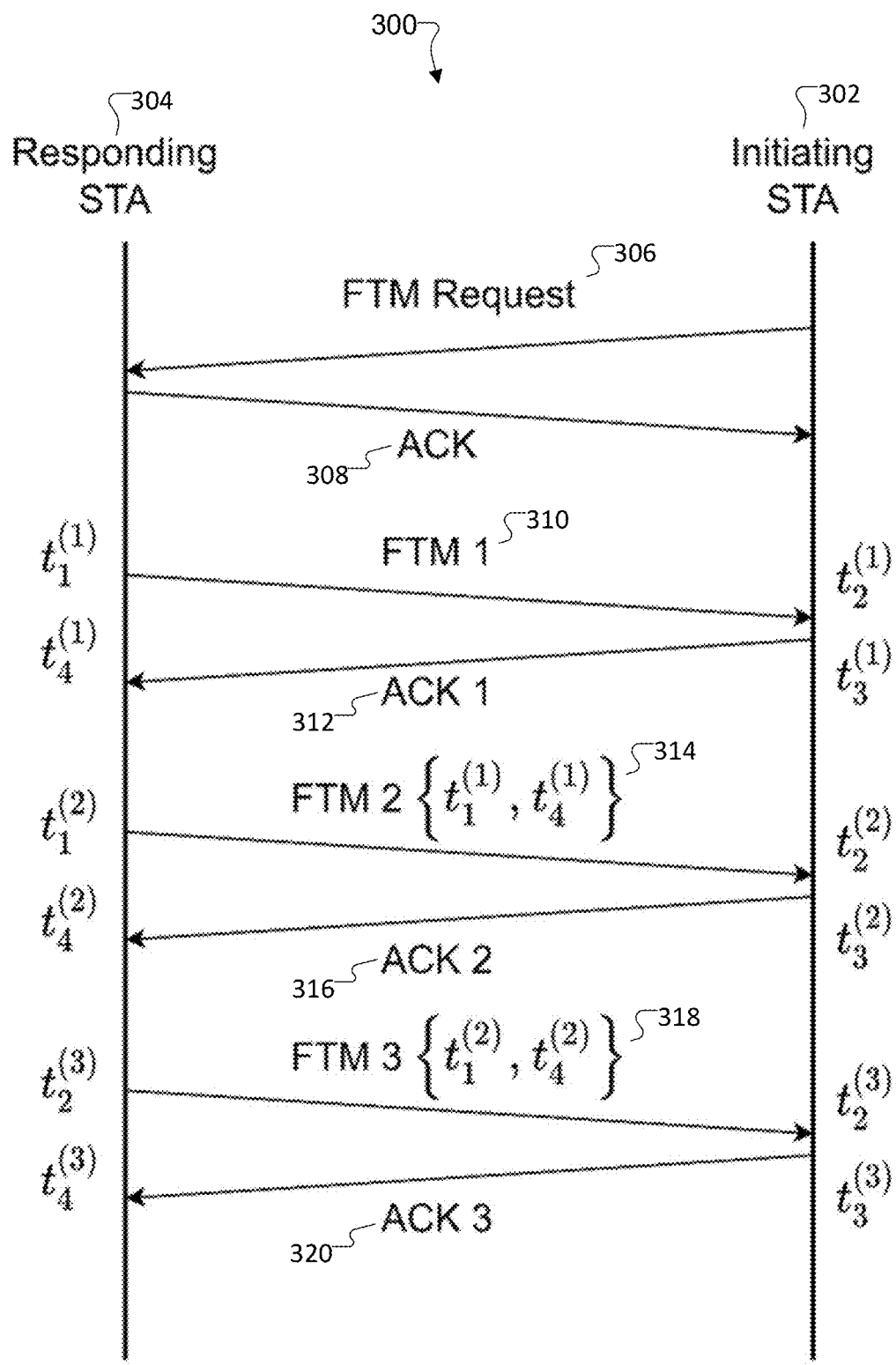
FIG. 3 illustrates an example measurement phase of an FTM session comprising one burst and 3 measurements (FTMs) per burst.

FIG. 3 illustrates an example measurement phase 300 of an FTM session comprising one burst and 3 measurements (FTMs) per burst.

As shown in FIG. 3, the initiating STA (I-STA) 302 sends an Initial FTM Request frame 306 to the responding STA (R-STA) 304, triggering the start of the FTM session. The R-STA 304 responds with an ACK 308.

The R-STA 304 then sends the first FTM frame 310 to the I-STA 302 and captures the time it is sent $t_1^{(1)}$. Upon receiving the first FTM frame 310, the I-STA 302 captures the time it was received $t_2^{(1)}$. The I-STA 302 responds with an ACK 312, and captures the time it is sent $t_3^{(1)}$. Upon receiving the ACK 312, the R-STA 304 captures the time it was received $t_4^{(1)}$.

The R-STA 304 sends a second FTM frame 314 to the I-STA 302 and captures the time it is sent $t_1^{(2)}$. The purpose of the second FTM frame 314 is twofold: First, the second FTM frame 314 is a follow-up to the first FTM frame 310, i.e., it is used to transfer the timestamps $t_1^{(1)}$ and $t_4^{(1)}$ recorded by the R-STA 304. Second, the second FTM frame 314 starts a second measurement. Upon receiving the second FTM frame 314, the I-STA 302 extracts the timestamps $t_1^{(1)}$ and $t_4^{(1)}$ and computes the RTT according to the following equation:

$$RTT = \left(t_4^{(1)} - t_1^{(1)}\right) - \left(t_3^{(1)} - t_2^{(1)}\right).$$

The I-STA 302 also responds with an ACK 316, and captures the time the second FTM frame 314 was received $t_2^{(2)}$.

The two STAs 302 and 304 continue exchanging FTM frames and ACKs for as many measurements as has been negotiated between the two. In the measurement phase 300, this includes a third FTM frame 318 and a third ACK 320.

In order to be useful for positioning and proximity apps, the RTT between the two STAs 302 and 304 can be translated into a distance, such as by the following equation:

$$d = \frac{RTT}{2} c.$$

where d is the distance between the two STAs and c is the speed of light.

Each FTM of the burst will yield a distance sample, with multiple distance samples per burst. Given multiple FTM bursts and multiple measurements per burst, the distance samples can be combined in different ways to produce a representative distance measurement. For example, the mean distance, the median distance, or some other percentile of distance can be reported. Furthermore, other statistics (e.g., the standard deviation) could be reported as well to be used by the positioning algorithm.

The FTM based mechanism is fundamentally limited by the bandwidth and SNR of the Wi-Fi system. For example, for 80 MHz Wi-Fi bandwidth and typical channel SNRs, approximately 1-3 meters ranging accuracy is feasible with high probability. This ranging accuracy in turn limits the localization accuracy to about a similar order. Such a level of accuracy may be unsuitable for several applications which require or benefit from a much finer range resolution. Although multiple adjacent FTM measurements can be averaged to improve range accuracy, the accuracy suffers when the target device is moving between the FTM measurements being averaged. IEEE is working on increasing the bandwidth of Wi-Fi-ranging to 320 MHz, which comes at a significant price and power penalty. Some indirect methods to increase bandwidth by bandwidth stitching are also impractical since they require hardware changes and need devices to hop across multiple bands.

To address these and other issues, this disclosure provides systems and methods for Wi-Fi based fine ranging by exploiting carrier phase information. As described in more detail below, the disclosed embodiments augment the accuracy of Wi-Fi RTT estimation by exploiting the Wi-Fi CSI measured at the anchor and the target device. In particular, the disclosed embodiments use the inter-subcarrier phase of CSI to improve the estimation of packet detection time and correspondingly the round-trip time via super-resolution methods. In addition, the disclosed embodiments use the absolute phase of the CSI, known as the carrier phase component, to estimate relative changes in range in between adjacent measurements, with an accuracy related to the carrier frequency.

The disclosed embodiments provide multiple advantageous benefits over conventional systems that perform Wi-Fi RTT estimation, including much greater accuracy. For example, with a 5 GHz carrier frequency, the accuracy of range difference measurements using the disclosed embodiments can potentially be <1 cm (i.e., about the order of two wavelengths), independent of bandwidth.

Although the details below are provided assuming a Wi-Fi system as an example, this shall not be considered as a restriction and the provided embodiments shall be applicable to any wireless communication technology that is capable of bi-directional communication, can capture a time of transmission of transmission and reception of messages, and track the channel state information either in the frequency domain (such as with an OFDM system) or in delay domain (such as in a UWB system).

Figure 4:
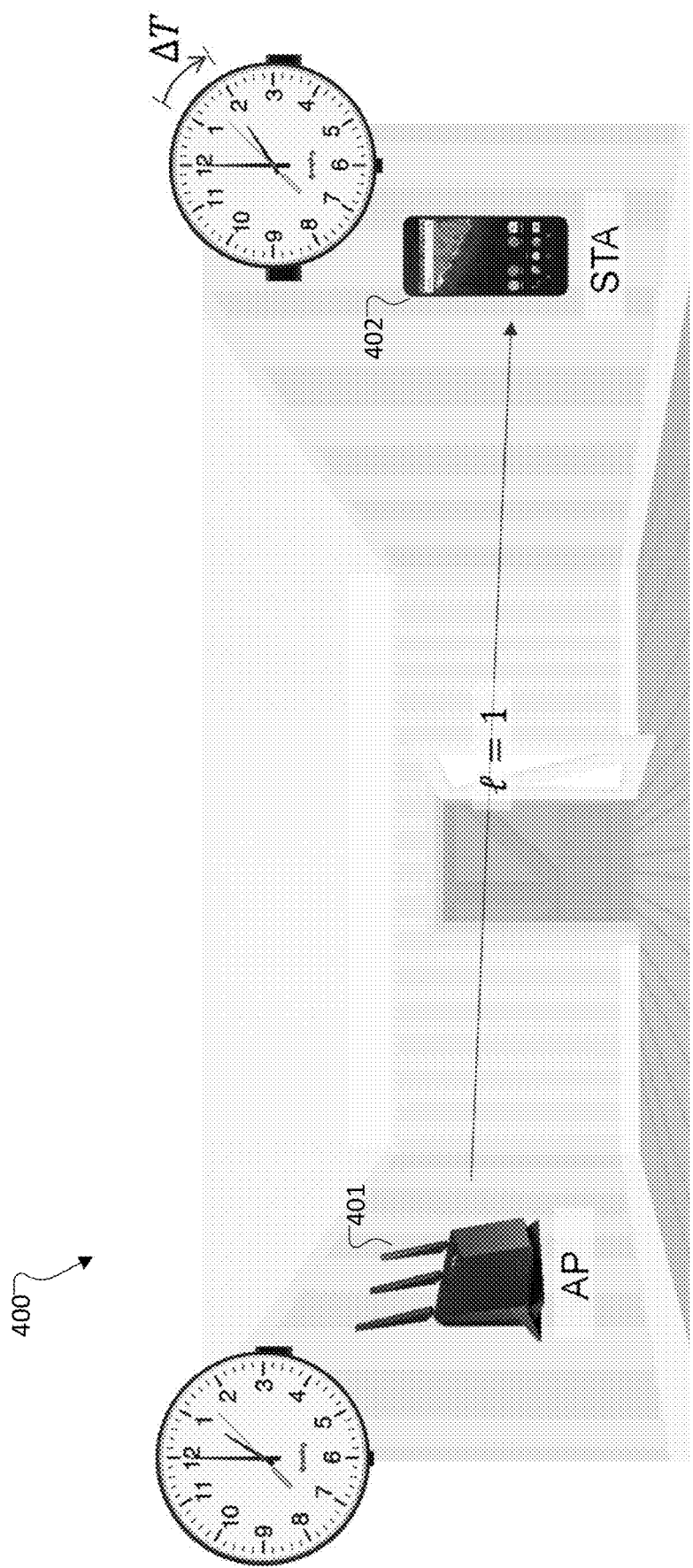
FIG. 4 illustrates an example system in which Wi-Fi-based fine range estimation can be performed according to various embodiments of the present disclosure.

FIG. 4 illustrates an example system 400 in which Wi-Fi-based fine range estimation can be performed according to various embodiments of the present disclosure. As shown in FIG. 4, the system 400 includes a Wi-Fi anchor 401 with one antenna and a Wi-Fi target device 402 with one antenna, whose distance or range from the anchor 401 is to be measured. It is noted that the presence of only one antenna at either device is merely an example, and should not be construed as a limitation on the embodiments presented in this disclosure. In some embodiments, the anchor 401 can be an AP and the target device 402 can be a Wi-Fi STA or vice versa. In other embodiments, both the anchor 401 and the target device 402 can be STAs or both can be APs.

Figure 5:
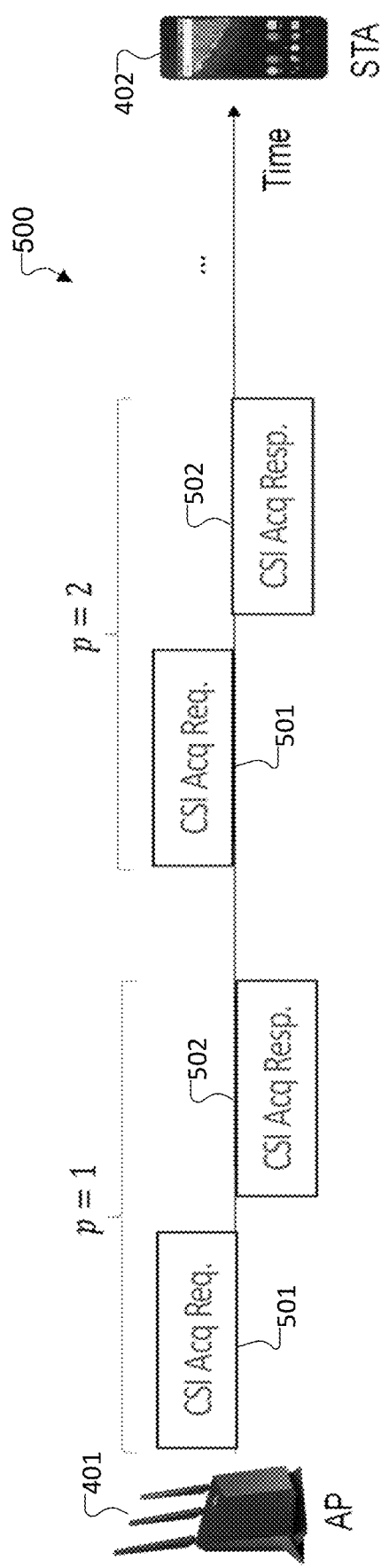
FIG. 5 illustrates an example timeline for CSI acquisition frame transmission in the system of FIG. 4 according to various embodiments of the present disclosure.

FIG. 5 illustrates an example timeline 500 for CSI acquisition frame transmission in the system 400 according to various embodiments of the present disclosure. As shown in FIG. 5, to enable estimation of the range, the anchor 401 may transmit a sequence of Wi-Fi channel state information (CSI) acquisition request frames 501, indexed as p={1, 2, ..., P}. For each such CSI frame p, the target device 402 may also transmit a CSI acquisition response frame 502, which can be, for example, an acknowledgement frame.

These CSI acquisition frame exchanges between the anchor 401 and the target device 402 may take place on a specific channel from a plurality of available channels. The list of available channels may be, for example, provided by the anchor 401. The available channels can also include multiple carrier frequency channels, as in multi-link operation of Wi-Fi-7. The anchor 401, the target device 402, or another ranging device may initiate a procedure for selecting the appropriate channel, from the list of available channels, for performing these exchanges. Such a selection can be based on several factors, including one or more of:

The RSSI and/or the OBSS interference on the channel.
The bandwidth and carrier frequency of the channel.
The occupancy of the channel.
The band capabilities of the target and anchor device.
The primary and secondary channel assignments for the anchor device (if applicable), etc.

For example, a channel with less occupancy (to ensure predictable inter-frame exchange times) and lower carrier frequency (to maximize the trackable velocity) can be preferable for the carrier-phase based differential range estimation used in Operation 6 (described later). In one example, the identified channel may first be requested by a target device, and it may then be confirmed by the anchor device, or an alternative may be suggested by the target device. In some embodiments, the channel can be identified by indicating operating class, channel number, and secondary channel offset for the determined channel.

In some embodiments, the CSI acquisition frames (including the CSI acquisition request frames 501 and the CSI acquisition response frames 502) can be transmitted using orthogonal frequency division multiplexing (OFDM) over K sub-carriers indexed as:

$$\mathcal{K} = \left\{ \left\lfloor \frac{-K+1}{2} \right\rfloor, \ldots, 0, \ldots, \left\lfloor \frac{K-1}{2} \right\rfloor \right\}.$$

Figure 6:
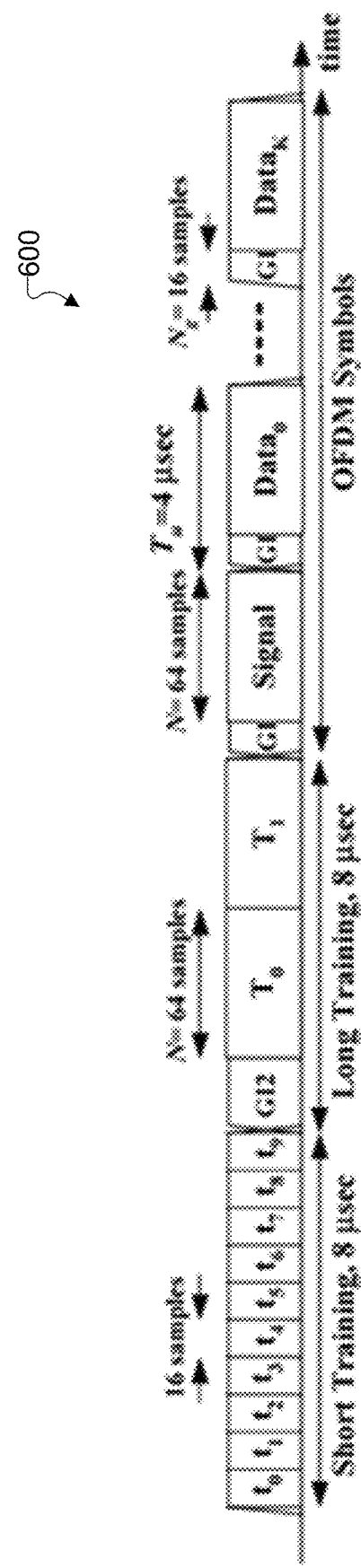
FIG. 6 illustrates a typical frame structure of an 802.11a frame.

Each such CSI acquisition frame may have a short training field (STF) and a long training field (LTF), followed by several OFDM symbols. For example, in Wi-Fi 802.11a, each frame is transmitted via OFDM modulation, with K=64 subcarriers in each 20 MHz bandwidth and a symbol duration of $T_s=4$ µs (including 0.8 µs of guard interval $T_{cp}$). FIG. 6 illustrates a typical frame structure 600 of an 802.11a frame.

Using the overall information collected from the CSI acquisition request frames 501 and the CSI acquisition response frames 502, the goal is to obtain, at the anchor 401 or the target device 402, an accurate round-trip time (RTT) estimate for use in ranging.

In some embodiments, for each CSI acquisition request or response frame p sent by either the anchor 401 or the target device 402, the corresponding recipient can estimate the channel CSI using one or more of the OFDM symbols in the frame and using one or more subcarriers in the one or more OFDM symbols. For example, these OFDM symbols can be from the LTF of the frame. Without loss of generality, let the $M_1$-th OFDM symbol of the CSI acquisition request frame 501 be used for estimating CSI at the target device 402, while the $M_2$-th OFDM symbol of the CSI acquisition response frame 502 be used for estimating CSI at the anchor 401. Each CSI acquisition request frame 501 and the corresponding CSI acquisition response frame 502 can be used together to obtain an estimate of the RTT corresponding to frame p, as shall be explained below.

For simplicity, it is assumed that the channel between the anchor 401 and the target device 402 is a strongly line of sight (LoS) channel with a one-way propagation delay of $\rho_p$ for CSI frame sequence p. Note that RTT is twice the propagation delay (i.e., RTT=$2\rho_p$). It is also assumed that the system clock between the anchor 401 and the target device 402 may have an unknown clock offset $\Delta T_p$ at the start of transmission of the p-th CSI acquisition request frame 501. It is further assumed that the difference in the carrier phase between the anchor 401 and the target device 402 is $\phi_p$ at the start of transmission of the p-th CSI acquisition request frame 501. Note that since the target device 402 can be moving and the oscillators at the two devices 401 and 402 (which generate the system clock and carrier) may also drift apart, therefore $\rho_p$, $\Delta T_p$, can change with the frame index p={1, ..., P}.

The anchor 401 and the target device 402 each have their own crystal oscillator. It is assumed that the oscillator frequency of the target device 402 may differ from the oscillator frequency of the anchor 401 by an unknown factor of $\eta_p$ (typically $|\eta_p| \approx 10^{-5}$). Note that $\eta_p$ causes the carrier frequency at the target device 402 to be $(1+\eta_p)f_c$, where $f_c$ is the carrier frequency at the anchor 401. Also note that this offset also causes the OFDM symbol duration for packets generated at the target device 402 to be of duration $(1-\eta_p)T_s$, where $T_s$ is the symbol duration at the anchor 401. Since the difference in the carrier frequencies of the two devices 401 and 402, called carrier frequency offset (CFO), is dependent on $\eta_p$, a CFO estimation performed for each frame p can also be used to estimate the value of $\eta_p$ as will be described in greater detail below. Note that although $\eta_p$ can be dependent on the frame index p, the value of $\eta_p$ may vary smoothly with time, i.e., may be very similar for adjacent values of p.

Figure 7:
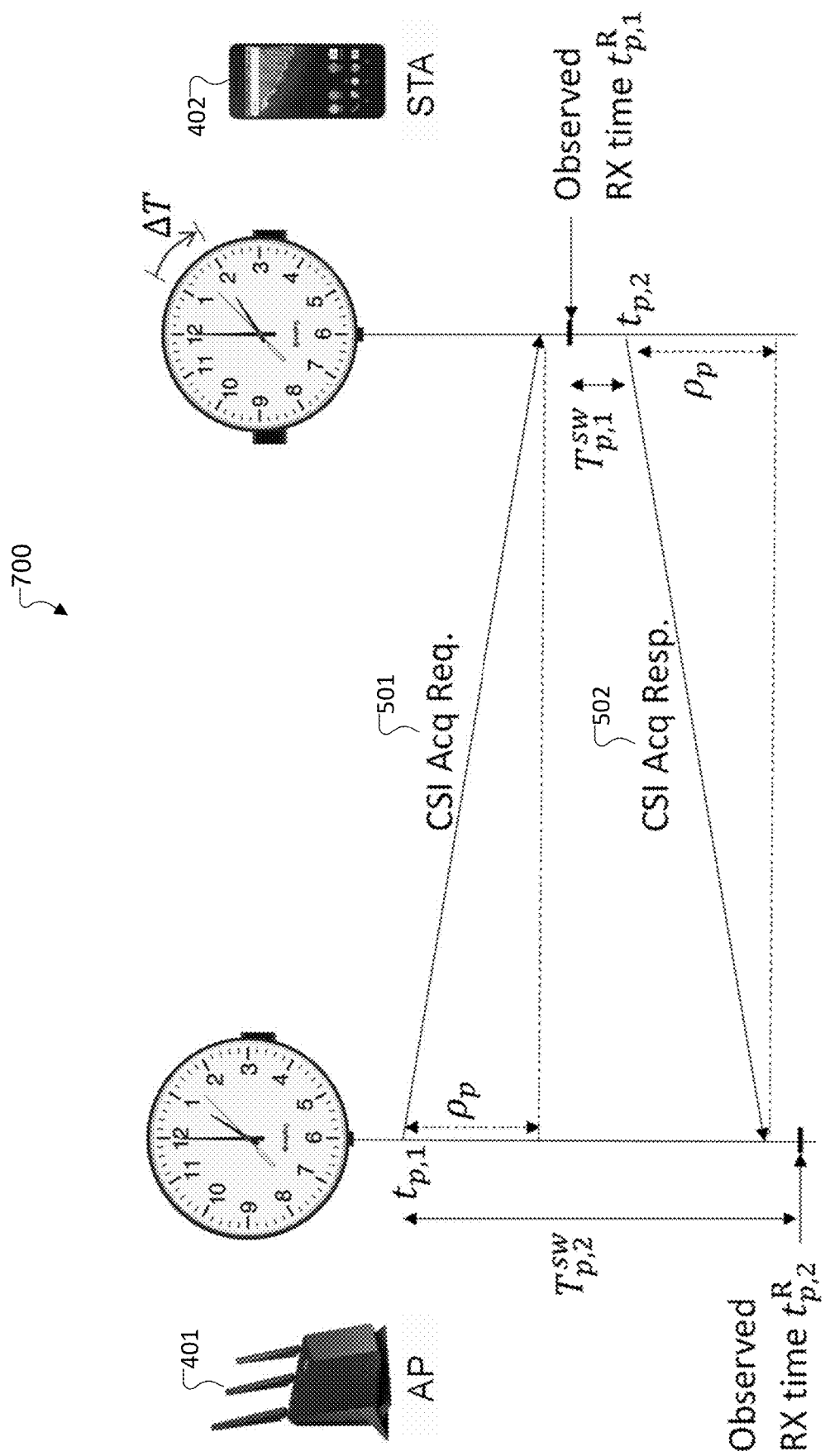
FIG. 7 illustrates an example timing diagram showing a timing calculation from a CSI Acquisition request/response frame for use by the system of FIG. 4, according to various embodiments of the present disclosure.

FIG. 7 illustrates an example timing diagram 700 showing a timing calculation from a CSI Acquisition request/response frame for use by the system 400, according to various embodiments of the present disclosure.

As shown in FIG. 7, the anchor 401 sends the p-th CSI acquisition request frame 501 at time $t_{p,1}$ (measured in its own clock). The time of reception of CSI acquisition request frame 501, as measured by the target device 402 in its own clock, is $t_{p,1}^R$. It can then be shown that:

$$t_{p,1}^R = t_{p,1} + (1 + \eta_p)\rho_p + \Delta T_p - \tau_{p,1}, \approx t_{p,1} + \rho_p + \Delta T_p - \tau_{p,1},$$

where $\tau_{p,1}$ is the error in the detection of the frame start time at the target device 402. Using the STF and LTF of the CSI acquisition request frame 501, and the pilot sub-carriers within all the OFDM symbols of the frame 501, a very fine and accurate estimate of the carrier frequency offset $\eta_p f_c$ can be obtained at the target device 402, and used to compensate for the intra-frame carrier phase rotation. After removing this intra-frame carrier phase rotation, the measured CSI (for subcarriers $k \in \mathcal{K}$) from the $M_1$-th symbol of the CSI acquisition request frame 501 can be expressed as:

$$H_{p,k}^1 = e^{-j\phi_p} e^{-j2\pi f_c \rho_p} e^{-j2\pi \eta f_c \left(\rho_p - \frac{\tau_{p,1}}{1+\eta_p}\right)} e^{-\frac{j2\pi f_k \tau_{p,1}}{1+\eta_p}} e^{-\frac{j2\pi f_k \eta_p M_1 T_s}{1+\eta_p}} e^{\frac{j2\pi n_{p,1}}{N}},$$

where $f_k = k/(T_s - T_{cp})$ is the frequency offset of the k-th subcarrier from the carrier frequency at the anchor 401, $T_{cp}$ is the duration of the guard interval/cyclic prefix in an OFDM symbol, $n_p \in \{0, \ldots, N\}$ is an arbitrary integer and N is an arbitrary phase ambiguity factor that depends on the receiver implementation. Typically, N=1, 2, or 4. Using the fact that $\eta_p^2 \approx 0$ and $f_c \rho_p$, $f_k \tau_{p,1}$, $f_c \tau_{p,1}$, $f_k M_1 T_s$ are typically much smaller than $1/\eta_p$ this can be approximated as:

$$H_{p,k}^1 \approx e^{-j\phi_p} e^{-j2\pi f_c \rho_p} e^{-j2\pi f_k \tau_{p,1}} e^{\frac{j2\pi n_{p,1}}{N}}.$$

Note that this CSI can be used to obtain an estimate $\hat{\tau}_{p,1}$ of $\tau_{p,1}$ and an estimate $$\hat{\psi}_{p,1} \text{ of } \mod\left\{2\pi f_c \rho_p + \phi_p - \frac{2\pi n_{p,1}}{N}, 2\pi\right\}$$

at the target device 402.

Similarly, the target device 402 sends the p-th CSI acquisition response frame 502 at time $t_{p,2}$ (measured in its own clock). Let the time of reception of the CSI acquisition response frame 502, as measured by the anchor 401 in its own clock, be $t_{p,2}^R$. It can then be shown that:

$$t_{p,2}^R - t_{p,1} = \frac{t_{p,2} - t_{p,1}}{\eta_p + 1} + \frac{1 + 2\eta}{\eta_p + 1}\rho_p - \frac{\Delta T_p}{\eta_p + 1} - \tau_{p,2}, \Rightarrow t_{p,2}^R =$$

$$t_{p,2} - \frac{\eta_p}{\eta_p + 1}(t_{p,2} - t_{p,1} - \Delta T_p - \rho_p) + \rho_p - \Delta T_p - \tau_{p,2},$$

where $\tau_{p,2}$ is the error in the detection of the frame start time at the anchor 401. Using the fact that $$\eta_p^2 \approx 0 \text{ and } \tau_{p,1} \ll t_{p,2} - t_{p,1}^R,$$

the following can be determined:

$$t_{p,2}^R \approx t_{p,2} - \eta_p T_{p,1}^{sw} + \rho_p - \Delta T_p - \tau_{p,2}$$

where $$T_{p,1}^{sw} \triangleq t_{p,2} - t_{p,1}^R$$

is the switching time between the reception of the p-th CSI acquisition request frame 501 and transmission of the p-th CSI acquisition response frame 502 as measured by the target device 402.

Using the STF and LTF of the CSI acquisition response frame 502, and the pilot sub-carriers within all the OFDM symbols of the frame, a very fine and accurate estimate of the carrier frequency offset—$\eta_p f_c$ can be obtained at the anchor 401 and used to compensate the intra-frame carrier phase rotation. After removing this intra-frame carrier phase rotation, the measured CSI (for $k \in \mathcal{K}$) at the anchor 401 from the $M_2$-th symbol of the CSI acquisition response frame 502 can be expressed as:

$$H_{p,k}^2 = e^{j\phi_p} e^{-j2\pi f_c \rho_p} e^{j2\pi \eta_p f_c (t_{p,2}^R - \rho_p - t_{p,1})} e^{-j2\pi(1+\eta_p) f_k \tau_{p,2}} e^{j2\pi(1+\eta_p) f_k \eta_p M_2 T_s} e^{j\theta} e^{\frac{j2\pi n_{p,2}}{N}},$$

where $e^{j\theta}$ is an unknown phase that models the aggregate asymmetry between the transmit and receive chains of the anchor 401 and the target device 402.

Using the fact that $\eta_p^2 \approx 0$, and $f_c \rho_p$, $f_k \tau_{p,2}$, $f_k M_2 T_s$ are typically much smaller than $1/\eta_p$, the measured CSI can be approximated as:

$$H_{p,k}^2 \approx e^{j\phi_p} e^{-j2\pi f_c \rho_p} e^{j2\pi \eta_p f_c T_{p,2}^{sw}} e^{-j2\pi f_k \tau_{p,2}} e^{j\theta} e^{\frac{j2\pi n_{p,2}}{N}},$$

where $$T_{p,2}^{sw} \triangleq t_{p,2}^R - t_{p,1}$$

is the switching time between the reception of the p-th CSI acquisition response frame 502 and transmission of the p-th CSI acquisition request frame 501 as measured by the anchor 401. Note that this CSI can be used to obtain an estimate $\hat{\tau}_{p,2}$ of $\tau_{p,2}$ and $\hat{\psi}_{p,2}$ of $\text{mod}\left\{2\pi f_c \rho_p - 2\pi \eta_p f_c T_{p,2}^{sw} - \phi_p - \theta - \frac{2\pi n_{p,2}}{N}, 2\pi\right\}$ at the anchor 401.

In order to perform Wi-Fi based fine ranging by exploiting carrier phase information, a ranging device (which can represent the anchor 401, the target device 402, or another ranging device) performs multiple operations. Each of the operations will now be described, and the overall processes that include the operations will be described later.

Operation 1: Coarse Estimation of the Crystal Offset Factor $\eta$

In Operation 1, the crystal offset factor $\eta$, which represents the offset between the target device 402's crystal oscillator and the anchor 401's crystal oscillator, is estimated and stored. In some embodiments, this estimation operation may be skipped. In some embodiments, this estimation operation can be performed based on a trigger condition such as, for example, whenever a CSI acquisition frame is received or transmitted. Note that as shown in FIG. 6, each CSI acquisition packet has a STF, a LTF and several OFDM symbols each carrying some pilot subcarriers. Using a combination of the fields and the pilot subcarriers in the p-th CSI acquisition request frame, a fine estimate of the carrier frequency offset between the target device 402 and the anchor 401 can be obtained at the target device 402 as $\hat{f}_{p,1}^{CFO}$. The target device 402 can then obtain an estimate of the crystal offset factor as:

$$\bar{\eta}_{p,1} = \hat{f}_{p,1}^{CFO}/f_c.$$

In some embodiments, a smoothing filter can further be applied to average over the past estimates and thus improve the accuracy. For example, this can be given as:

$$\bar{\eta}_{p,1} = \sum_{q=p-A}^{p} \frac{\hat{f}_{q,1}^{CFO}}{(A+1)f_c} \text{ or } \bar{\eta}_{p,1} = \lambda \left(\frac{\hat{f}_{p,1}^{CFO}}{f_c}\right) + (1-\lambda)\hat{\eta}_{p-1,1}$$

Similarly, using a combination of the fields and the pilot subcarriers in the p-th CSI acquisition response frame, a fine estimate of the carrier frequency offset between the anchor 401 and the target device 402 can be obtained at the anchor 401 as $\hat{f}_{p,2}^{CFO}$. The anchor 401 can then obtain an estimate of the crystal offset factor as $$\bar{\eta}_{p,2} = -\hat{f}_{p,2}^{CFO}/f_c.$$

In some embodiments, a smoothing filter can further be applied to average over the past estimates and thus improve the accuracy, such as described above.

Operation 2: Estimation of the CSI Phase Parameters

In Operation 2, the slope and y-intercept of the CSI phase obtained from the CSI acquisition request frame 501 and the CSI acquisition response frame 502 can be estimated at the target device 402 and the anchor 401, respectively. In some embodiments, this estimation can be performed based on a trigger condition such as, for example, whenever a CSI acquisition frame is received or transmitted. Note that as shown above, if there is an error of $\tau_{p,1}$ in the estimation of the packet reception time for the p-th CSI acquisition request frame 501, then the corresponding CSI has the form:

$$H_{p,k}^1 \approx e^{-j2\pi f_c \rho_p} e^{-j\phi_p} e^{-j2\pi f_k \tau_{p,1}} e^{\frac{j2\pi n_{p,1}}{N}} \quad (5)$$

Figure 8B:
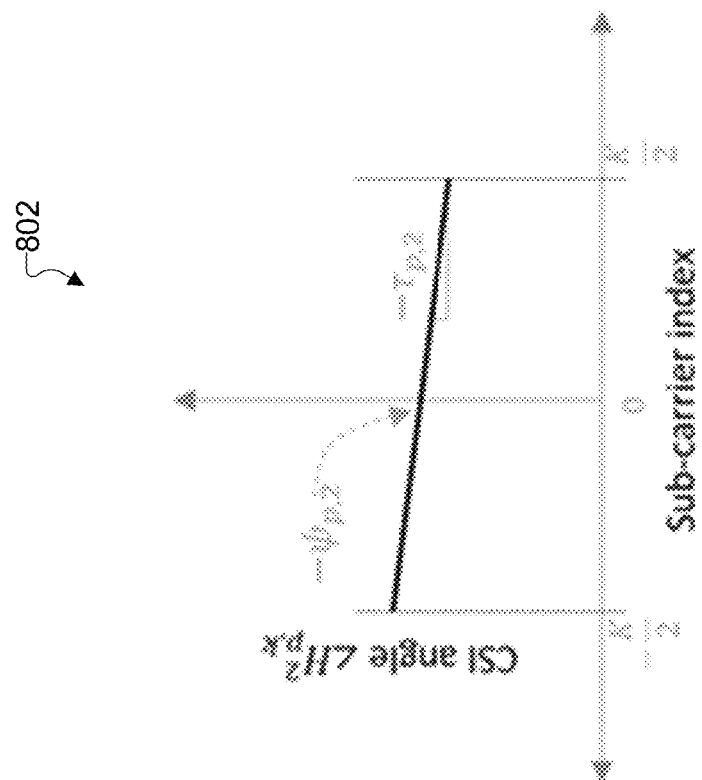
FIGS. 8A and 8B illustrate charts showing the effect of the packet start time error on the phase of CSI at a target device and an anchor, according to various embodiments of the present disclosure.
Figure 8A:
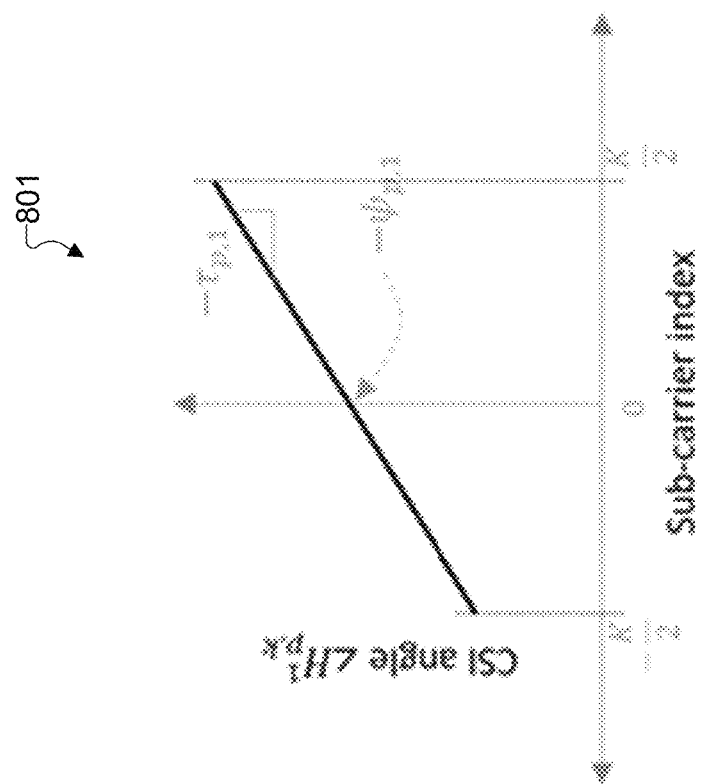

In other words, the CSI has a linearly varying slope as a function of $k \in \mathcal{K}$, as depicted in FIGS. 8A and 8B.

FIGS. 8A and 8B illustrate charts 801 and 802 showing the effect of the packet start time error on the phase of CSI at the target device 402 and the anchor 401, according to various embodiments of the present disclosure. In FIG. 8A, the chart 801 shows the phase of CSI as a function of the subcarrier index k at the target device 402. In FIG. 8A, the chart 802 shows the phase of CSI as a function of the subcarrier index k at the anchor 401. In both cases, the CSI has a linearly varying slope as a function of k.

Correspondingly, estimates $\hat{\tau}_{p,1}$, $\hat{\psi}_{p,1}$ of $\tau_{p,1}$ and carrier phase $$\psi_{p,1} \triangleq \text{mod}\left\{2\pi f_c \rho_p + \phi_p - \frac{2\pi n_{p,1}}{N}, 2\pi\right\},$$

respectively, can be obtained at the target device 402 from $$\{H_{p,k}^1 \mid k \in \mathcal{K}\}$$

using an algorithm such as Algorithm 1 shown below. Using the same algorithm, estimates $\hat{\tau}_{p,2}, \hat{\psi}_{p,2}$ of $\tau_{p,2}$ and $\psi_{p,2} \triangleq$ $$\text{mod}\left\{2\pi f_c \rho_p - 2\pi \eta_p f_c T_{p,2}^{sw} - \phi_p - \theta - \frac{2\pi n_{p,2}}{N}, 2\pi\right\},$$

respectively, can be estimated at the anchor 401 from $$\{H_{p,k}^2 \mid k \in \mathcal{K}\}.$$

Algorithm 1:
 Inputs: Complex channel inputs from all subcarriers $\{H_{p,k} | k \in \mathcal{K}\}$.
 Optional Inputs: Complex channels and their phase-outputs from past A CSI frames: $\hat{\tau}_q, \hat{\psi}_q \{H_{q,k}|k \in \mathcal{K}\}$ for $q=p-A, \ldots, p-1$.
 Perform one of the following estimation methods:
 1. Perform root-MUSIC estimation on $H_{p,k}$ to obtain the dominant delays of the channel.
    Set the largest delay or the first dominant delay to $\hat{\tau}_p$ and estimate:

$$\hat{\psi}_q = -\text{angle}\left\{\sum_{k \in \mathcal{K}} H_{p,k} e^{j2\pi f_k \hat{\tau}_p}\right\}$$

2. Perform least squares estimation:

$$\hat{\tau}_p, \hat{\psi}_p = \underset{\tau,\psi}{\text{argmin}}\left\{\sum_{k \in \mathcal{K}} (\angle H_{p,k} + \phi + 2\pi f_k \tau)^2\right\}$$

3. Perform weighted least squares estimation:

$$\hat{\tau}_p, \hat{\psi}_p = \underset{\tau,\psi}{\text{argmin}}\left\{\sum_{k \in \mathcal{K}} (\angle H_{p,k} + \phi + 2\pi f_k \tau)^2\right\},$$

where the weight can be, for example:

$$\omega_k = |H_{p,k}|^2 \text{ or } \omega_k = \frac{1}{A+1}\sum_{q=p-A}^{p} |H_{q,k}|^2, \text{ etc.}$$

4. Compute $B_k$ as the average CSI for the last A CSI acquisition request frames after performing the phase correction, i.e., $$B_k = \frac{1}{A}\sum_{q=p-A}^{p-1} H_{q,k} e^{j[2\pi f_k \hat{\tau}_q + \hat{\psi}_q]}$$

Then perform the weighted least squares estimation:

$$\hat{\tau}_p, \hat{\psi}_p = \underset{\tau,\psi}{\text{argmin}}\left\{\sum_{k \in \mathcal{K}} |B_k^* H_{p,k}| [\angle(B_k^* H_{p,k}) + \psi + 2\pi f_k \tau]^2\right\}$$

5. Compute $B_k$ as the average CSI for the last A CSI acquisition request frames after performing the phase correction, i.e., $$B_k = \frac{1}{A}\sum_{q=p-A}^{p-1} H_{q,k} e^{j[2\pi f_k \hat{\tau}_q + \hat{\psi}_q]}$$

Then for a new packet, find:

$$\hat{\tau}_p = \underset{\tau}{\text{argmax}} \left|\sum_k B_k^* H_{p,k} e^{j2\pi f_k \hat{\tau}}\right|, \hat{\psi}_p = -\text{angle}\{\sum B_k^* H_{p,k} e^{j2\pi f_k \hat{\tau}_p}\}$$

Outputs: $\hat{\tau}_p, \hat{\psi}_p$

Operation 3: Sharing of the Ranging Parameters

In some embodiments, the target device 402 measures $t_{p,1}^R, t_{p,2}$ and estimates $\bar{\eta}_{p,1}, \hat{\tau}_{p,1}, \hat{\psi}_{p,1}$ using Operations 1 and 2 above and then stores them. Similarly, the anchor 401 measures $t_{p,1}, t_{p,2}^R$ and estimates $\bar{\eta}_{p,2}, \hat{\tau}_{p,2}, \hat{\psi}_{p,2}$ using Operations 1 and 2 above and stores them. In some embodiments, Operation 1 may be skipped by either the target device 402 or the anchor 401, and they may use a pre-determined value such as $\bar{\eta}_{p,1}=0$ or $\bar{\eta}_{p,2}=0$, respectively. These values are then subsequently shared to a ranging device that is responsible for performing the range estimation. Such a ranging device can be the anchor 401, the target device 402, or any other suitable device. The condition for sharing the parameters can be a trigger. For example, the trigger can be after each CSI acquisition request/response frames exchange is complete, or it can be after a batch of multiple CSI acquisition request/response frame exchanges are complete.

In some embodiments, the target device 402 and/or the anchor 401 may not store, or they may not transmit, the values of $\bar{\eta}_{p,1}$ and/or $\bar{\eta}_{p,2}$ to the ranging device. In some embodiments, where the ranging device is the target device 402, the parameters to be shared from the anchor 401 can be encoded within the CSI acquisition response frame 502. In some embodiments, when sharing the parameters, an identifier field may also be included to uniquely identify the anchor 401 and the target device 402 to which the parameters belong. Such an identifier can be, for example, the MAC address of either device. In some embodiments, the frame index p may also be included when sharing the information to indicate the sequence number of the measurements. In some embodiments, the anchor 401 and/or the target device 402 may also determine the type of RTT estimation algorithms that should be used and may include the determined result in the information shared with the ranging device.

Operation 4: Fine Estimation of Crystal Offset Factor

In some embodiments, this operation may be simplified, and the fine crystal offset factor $\bar{\eta}_p$ may be set as $$\hat{\eta}_p = \frac{\bar{\eta}_{p,1} + \bar{\eta}_{p,2}}{2}.$$

In some embodiments, when the values of $\bar{\eta}_{p,1}$ and/or $\bar{\eta}_{p,2}$ are not shared with the ranging device, the ranging device may use a predetermined value (such as 0) for the missing value. In some embodiments, the CSI acquisition request frame 501 can be kept as a long frame to ensure that the estimate of $\bar{\eta}_{p,1}$ has higher precision. In some embodiments, depending on the size or length of the CSI acquisition request frame 501 and the CSI acquisition response frame 502, the precision of the frequency offset estimates $\bar{\eta}_{p,1}$ and $\bar{\eta}_{p,2}$ can be different. Correspondingly, a weighted combination of the two frequency offset estimates can be used, i.e., use $$\hat{\eta}_p = \alpha \bar{\eta}_{p,1} + (1-\alpha)\bar{\eta}_{p,2} \text{ instead of } \frac{\bar{\eta}_{p,1} + \bar{\eta}_{p,2}}{2}.$$

In some embodiments, the precision of $\hat{\eta}_p$ from above may be insufficient and a further estimation step may be performed using the values of $\hat{\psi}_{p,1}$, $\hat{\psi}_{p,2}$, $t_{p,1}$, $t_{p,2}^R$ that are accumulated over a window of time W=0.5 s (or another suitable length of time). This estimation step can be based on the observation that:

$$N(\hat{\psi}_{p,1} - \hat{\psi}_{p,2} - \hat{\psi}_{p-1,1} + \hat{\psi}_{p-1,2}) = \\ \mod\{2\pi N f_c[\eta_p(t_{p,2}^R - t_{p-1,2}^R) + \eta_{p-1}(t_{p,1} - t_{p-1,1})]\},$$

and noting that $\eta_p$, remains almost the same for W time. In one example, this estimation may be performed using an algorithm such as Algorithm 2 shown below:

Algorithm 2:

Inputs: $\hat{\psi}_{p,1}$, $\hat{\psi}_{p,2}$, $t_{p,1}$, $t_{p,2}^R$, $\hat{\eta}_p$ for p=1, ..., P.

W=0.5 secs.

$T_{max}$=1 ms.

$W_{max} = \lceil(t_{p,1} - t_{1,1})/W\rceil$.

$\bar{Q} = \{ \}$.

For w=1:1:$W_{max}$ $T_{st} = t_{1,1} + (w-1)W$.

$T_{end} = t_{1,1} + wW$.

$Q = \{1 \leq p \leq P | T_{st} \leq t_{p,1} \leq T_{end}, |t_{p,1} - t_{p-1,1}| < T_{max}\}$.

//Here the $T_{max}$ limit can be to ensure that the variation in $\eta_p$ over the window of W can be neglected.

Compute:

$$f_{opt} = \underset{|f| \leq F}{\operatorname{argmax}} \operatorname{Re} \left\{ \sum_{p \in Q} e^{jN(\hat{\psi}_{p,1} - \hat{\psi}_{p,2} - \hat{\psi}_{p-1,1} + \hat{\psi}_{p-1,2})} e^{-j2\pi N(f + \hat{\eta}_p f_c)[t_{p,2}^R - t_{p-1,2}^R + t_{p,1} - t_{p-1,1}]} \right\}$$

$\hat{\eta}_p = \hat{\eta}_p + f_{opt}/f_c$ for all $p \in Q$.

$\bar{Q} = \bar{Q} \cup Q$.

EndFor

For $p \in \{1, \ldots, P\} \backslash \bar{Q}$

Set $\hat{\eta}_p$ by performing linear interpolation of $\hat{\eta}_q$ values from $q \in \bar{Q}$ EndFor Outputs: $\hat{\eta}_p$ Operation 5: Coarse RTT Estimation In this operation, the frame transmission times $t_{p,1}$, $t_{p,1}^R$, $t_{p,2}$ and $t_{p,2}^R$ along with the estimated parameters $\hat{\tau}_{p,1}$, $\hat{\tau}_{p,2}$ are then used by the ranging device to obtain a coarse estimate of the round-trip time. In one embodiment, the RTT can be estimated as:

$$\widehat{RTT}_p \triangleq (t_{p,2}^R - t_{p,1} + \hat{\tau}_{p,2}) - (t_{p,2} - t_{p,1}^R + \hat{\tau}_{p,1}) + \hat{\eta}_p T_{p,1}^{sw},$$

where $$T_{p,1}^{sw} \triangleq t_{p,2} - t_{p,1}^R.$$

Using the equations for $t_{p,1}^R$ and $t_{p,2}^R$ this can be further expressed as:

$$\widehat{RTT}_p = 2\rho_p - (\eta_p - \hat{\eta}_p)T_{p,1}^{sw} + (\tau_{p,1} - \hat{\tau}_{p,1}) + (\tau_{p,2} - \hat{\tau}_{p,2})$$

Note that $2\rho_p$ is the true $RTT_p$ while the other terms are the residual errors. In some embodiments, to reduce the impact of the second term $(\Delta\eta_p)T_{p,1}^{sw}$ the value of $T_{p,1}^{sw}$ can be minimized by selecting the CSI acquisition response frame 502 as the ACK frame sent for the CSI acquisition request frame 501. In this case, the value of $T_{p,1}^{sw}$ is equal to the duration of the CSI acquisition request frame 501 plus a short interframe spacing duration of 10 μs. In some embodiments, the CSI acquisition request frame 501 can be a Null Data Packet (NDP) to keep its duration also short.

Operation 6: Fine RTT Estimation

In some embodiments, the use of Fine RTT estimation to improve the coarse RTT estimate is optional and can be determined by the ranging device based on the reported parameters from the anchor 401 and/or the target device 402. For example, the condition to perform fine RTT estimation can be based on (i) the RSSI between the anchor 401 and the target device 402 being above a threshold, or (ii) there being a strong static path in the CSI measured by either device 401 and 402, or (iii) the Rician K-factor of the measured CSI being above a threshold, or (iv) there being a running application that needs the fine RTT estimates. In some embodiments, the anchor 401 and/or the target device 402 may make the determination of whether to use the fine RTT estimation operation and may include the determination in the list of parameters shared with the ranging device. When the fine RTT estimation operation is used, the ranging device may add together the estimates $\hat{\psi}_{p,1}$ and $\hat{\psi}_{p,2}$ to obtain the sum carrier phase:

$$\overline{\psi}_p \triangleq N[\hat{\psi}_{p,1} + \hat{\psi}_{p,2} + \hat{\eta}_p 2\pi f_c T^{sw}_{p,2}],$$

where $$T^{sw}_{p,2} \triangleq t^R_{p,2} - t_{p,1}.$$

Using the equations for $\hat{\psi}_{p,1}$, $\hat{\psi}_{p,2}$ it can be shown that:

$$\overline{\psi}_p = \mathrm{mod}\{4\pi N f_c \rho_p - N\theta -$$

$$2\pi N(\eta_p - \hat{\eta}_p) f_c T^{sw}_{p,2} + N(\hat{\psi}_{p,1} - \psi_{p,1}) + N(\hat{\psi}_{p,2} - \psi_{p,2}), 2\pi\}.$$

By comparing $\overline{\psi}_p$ to $\overline{\psi}_{p-1}$, the incremental distance moved can be estimated as:

$$\overline{\psi}_p - \overline{\psi}_{p-1} \approx \mathrm{mod}\{4\pi N f_c (\rho_p - \rho_{p-1}), 2\pi\},$$

where the error terms are ignored for convenience. As long as $|\rho_p - \rho_{p-1}|$ is smaller than $$\frac{1}{4Nf_c},$$

the change in propagation delay can be estimated as $(\overline{\psi}_p - \overline{\psi}_{p-1})/4\pi Nf_c$.

In some embodiments, the anchor 401 and the target device 402 may make such CSI acquisition frame exchanges over L frequencies of operation: $f_c^{(1)}, f_c^{(2)}, \ldots, f_c^{(L)}$. An example of this can be in the multi-link operation devices provided by IEEE 802.11be. In such a case, multiple observations can be obtained as:

$$\overline{\psi}_p^{(\ell)} - \overline{\psi}_{p-1}^{(\ell)} \approx \mathrm{mod}\{4\pi N f_c^{(\ell)} (\rho_p - \rho_{p-1}), 2\pi\},$$

for $1 \leq \ell \leq L$. These multiple L measurements can then be used to uniquely identify the value of $\rho_p - \rho_{p-1}$ even if $|\rho_p - \rho_{p-1}|$ is larger than $$\frac{1}{4Nf_c},$$

by using, for example, the Chinese remainder theorem. A similar result can also be obtained in a single link case, by frequency hopping across L different carrier frequencies.

Note that the resolution of distance in the relative phase measurements $\overline{\psi}_p - \overline{\psi}_{p-1}$ is proportional to $1/f_c$, which can be orders of magnitude finer than the resolution of Operation 5, which can then be used in either of the below embodiments to refine the coarse RTT estimate.

In various embodiments, using such relative phase measurements between adjacent CSI acquisition frame exchanges, the coarse RTT estimates from Operation 5 from adjacent CSI acquisition frame exchanges can be combined to improve the estimation accuracy. As an example, some such fine RTT estimation methods can be one or more of the following:

$$\overrightarrow{RTT}_p = \lambda \overrightarrow{RTT}_p + (1-\lambda)\left(\overrightarrow{RTT}_{p-1} + \frac{\overline{\psi}_p - \overline{\psi}_{p-1}}{2\pi Nf_c}\right),$$

where $0 \leq \lambda \leq 1$ is the weight for current coarse RTT estimate.

$$\overrightarrow{RTT}_p = \lambda \overrightarrow{RTT}_p + (1-\lambda)\left(\overrightarrow{RTT}_{p-1} + \frac{\overline{\psi}_p - \overline{\psi}_{p-1}}{2\pi Nf_c}\right),$$

where $0 \leq \lambda \leq 1$ is the weight for current coarse RTT estimate.

$$\overrightarrow{RTT}_p = \sum_{q=p-A}^{p} \lambda_{p-q} \overrightarrow{RTT}_p, \text{ where } \sum_{a=0}^{A} \lambda_a = 1$$

are weights for different neighboring coarse RTT estimates. Note that this embodiment may not require computation of $\overline{\psi}_p, \overline{\psi}_{p-1}$.

Another method can be used to feed $$\overrightarrow{RTT}_p \text{ and } \frac{\overline{\psi}_p - \overline{\psi}_{p-1}}{2\pi Nf_c}$$

independently as the range and velocity estimates to a Kalman filter or a particle filter which then combines the estimates from adjacent CSI acquisition frames to perform an estimation of the range $\overline{RTT}_p$.

In various embodiment, using relative phase measurements between multiple adjacent CSI acquisition frame exchanges, the coarse RTT estimates from Operation 5 from multiple CSI acquisition frame exchanges can be combined to improve the estimation accuracy. In this embodiment, a motion model can be assumed where the velocity of the target device 402 remains substantially the same for A+1 adjacent CSI acquisition frame exchanges. In some embodiments, an algorithm may first be used to determine the applicability of such a motion model. For example, when the target device 402 is a robot, the determination can be made using information from the wheel velocity of the robot. In another example, if the target device 402 has an inertial measurement unit (IMU) sensor and/or a compass, information from these can be used to determine if the constant velocity model is applicable. As an example, such a constant velocity motion model may imply that the propagation delay satisfies:

$$\rho_q = \rho_p + v(t_{q,1} - t_{p,1})$$

for q=p−A, . . . , p where v is an unknown parameter that quantifies the piece-wise linear velocity in the vicinity of CSI acquisition request/response frame p.

In some embodiments, the sum CSI phase values can be used to estimate the velocity as:

$$\hat{v} = \underset{-v_{max} \leq v \leq v_{max}}{\operatorname{argmax}} \left| \sum_{q=p-A}^{p} e^{j[\overline{\psi}_q - 4\pi N f_c v t_{q,1}]} \right|,$$

where $v_{max}$ is related to the maximum expected velocity.

In some embodiments, prior information or side information from an IMU or other sensors can be used to determine an appropriate value of $v_{max}$ to use for CSI frame p. The estimate of this velocity can then be used to perform the fine RTT estimation as:

$$\overline{RTT}_p = \frac{\sum_{q=p-A}^{p} \left[ \overrightarrow{RTT}_q + 2\hat{v}(t_{p,1} - t_{q,1}) \right]}{A+1}$$

In some embodiments, the above estimation of $\hat{v}$ and computation of $\overline{RTT}_p$ can be repeated for each frame p. In other embodiments, a single value of $\hat{v}$ may be computed for a block of A+1 adjacent CSI acquisition frame exchanges and be used for computing $\overline{RTT}_p$ for each frame p in that block.

In some embodiments, the transmission times of the CSI acquisition request frames can be non-periodically arranged to increase the maximum value of $v_{max}$ that can be unambiguously estimated. In other words, the transmission times of adjacent CSI acquisition request frames can be selected to NOT satisfy: $t_{p,1} - t_{p-1,1} = T_{rep}$, for some fixed period $T_{rep}$. The transmission times of these CSI acquisition frames can be generated as for example:

- As a jittered Cox process: $t_{p,1} = pT_{rep} + w_p$, where $w_p$ is an independent and identically distributed and bounded random variable.
- Transmission times for a block of A+1 adjacent CSI acquisition request frames $[t_{p-A,1}, t_{2,1}, \ldots, t_{p,1}]$ can be generated such that the times form a Golomb ruler, a perfect ruler, a coprime array, or the like. However, the inter-block transmission can still be periodic.
- Transmission times for a block of A+1 adjacent CSI acquisition request frames $[t_{p-A,1}, t_{2,1}, \ldots, t_{p,1}]$ can be generated such that the intra-block time differences are relatively coprime to each other. However, the inter-block transmission can still be periodic. Some examples of such intra-block times are: {0, 2, 5} for A=2, {0, 2, 5, 7} for A=3, {0, 2, 5, 7, 11} for A=4, etc.

The use of such non-periodic transmission times may increase the maximum value of $v_{max}$ that can be unambiguously identified using:

$$\hat{v} = \underset{-v_{max} \leq v \leq v_{max}}{\operatorname{argmax}} \left| \sum_{q=p-A}^{p} e^{j[\overline{\psi}_q - 4\pi N f_c v t_{p,1}]} \right|.$$

Figure 9A:
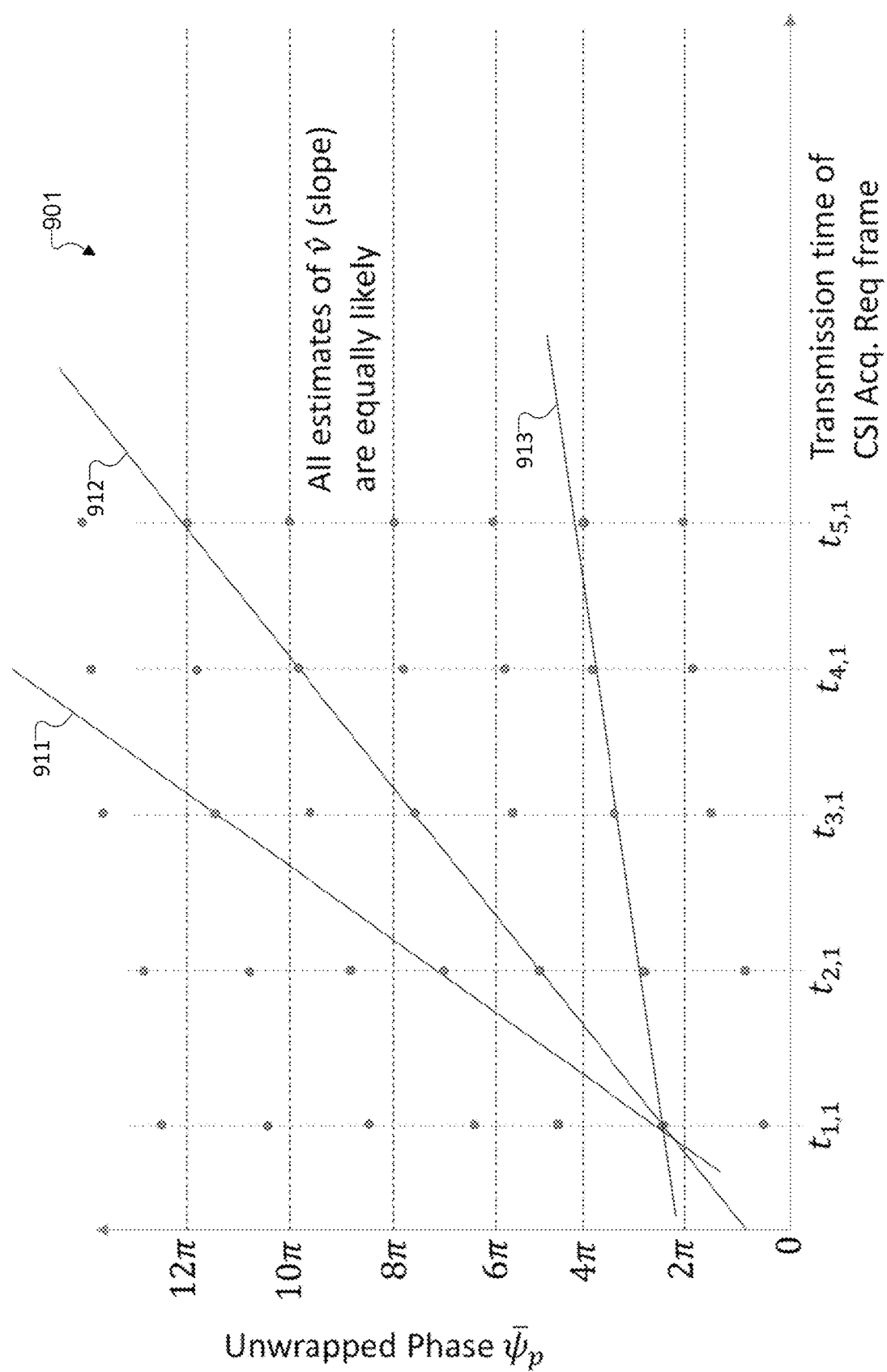
FIGS. 9A and 9B illustrate charts comparing estimation of device velocity based on transmission periodicity of CSI acquisition frames, according to various embodiments of the present disclosure.
Figure 9B:
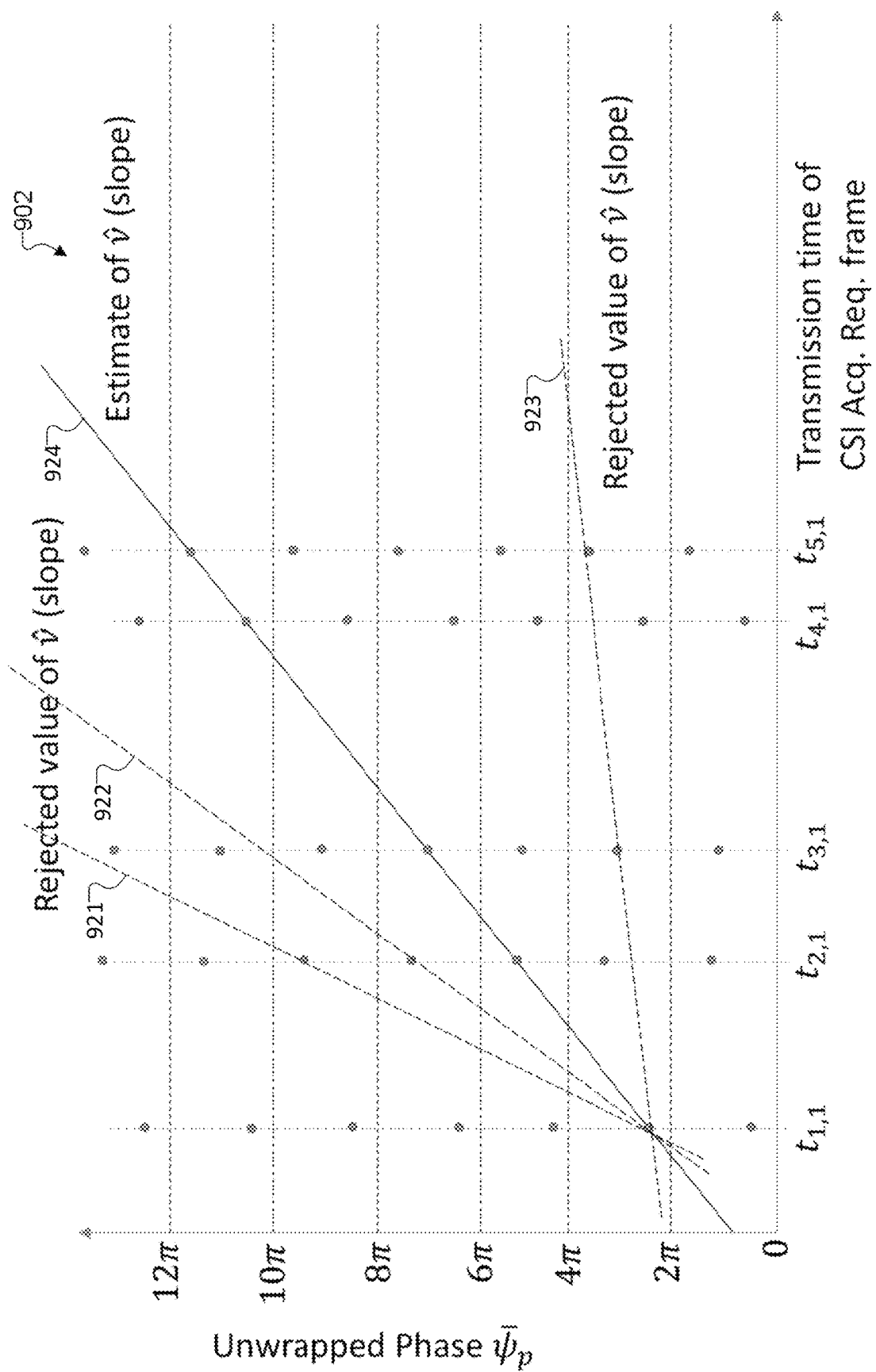

This fact that non-periodicity can help break the ambiguity is illustrated pictorially in FIGS. 9A and 9B.

FIGS. 9A and 9B illustrate charts 901 and 902 comparing estimation of device velocity based on transmission periodicity of CSI acquisition frames, according to various embodiments of the present disclosure. In FIG. 9A, the chart 901 shows how estimation of v can be ambiguous when the CSI acquisition frames are periodically transmitted. In the chart 901, the transmission times on the x axis are equally spaced, and the estimate of $\hat{v}$ is equal to the slope of each of the plot lines 911-913. Because each plot line 911-913 passes through a plot point at each transmission time, each of the plot lines 911-913 is equally likely, and the estimates of $\hat{v}$ determined by the slopes of the plot lines 911-913 are equally likely. Thus, the estimate of $\hat{v}$ is ambiguous, because there is no estimate that is clearly more likely than the others.

In contrast, in FIG. 9B, the chart 902 shows how estimation of $\hat{v}$ can be unambiguous when the CSI acquisition frames are not periodically transmitted. In the chart 902, the transmission times of the x axis are not equally spaced (i.e., not periodically transmitted). As a result, the plot lines 921-923 do not pass through a plot point at each transmission time. Thus, the plot lines 921-923 can be rejected as possible candidates. Only the plot line 924 passes through a plot point at each transmission time. Thus, the plot line 924 is the only likely candidate, and the estimate of $\hat{v}$ can be determined by the slope of the plot line 924 with little or no ambiguity.

Operation 7: Conversion to Range Estimation

Using the estimate of RTT, the range estimate $\mathcal{A}_p$ can be obtained as:

$$\hat{\mathcal{A}}_p = (3 \times 10^8) \overline{RTT}_p / 2$$

Figure 10:
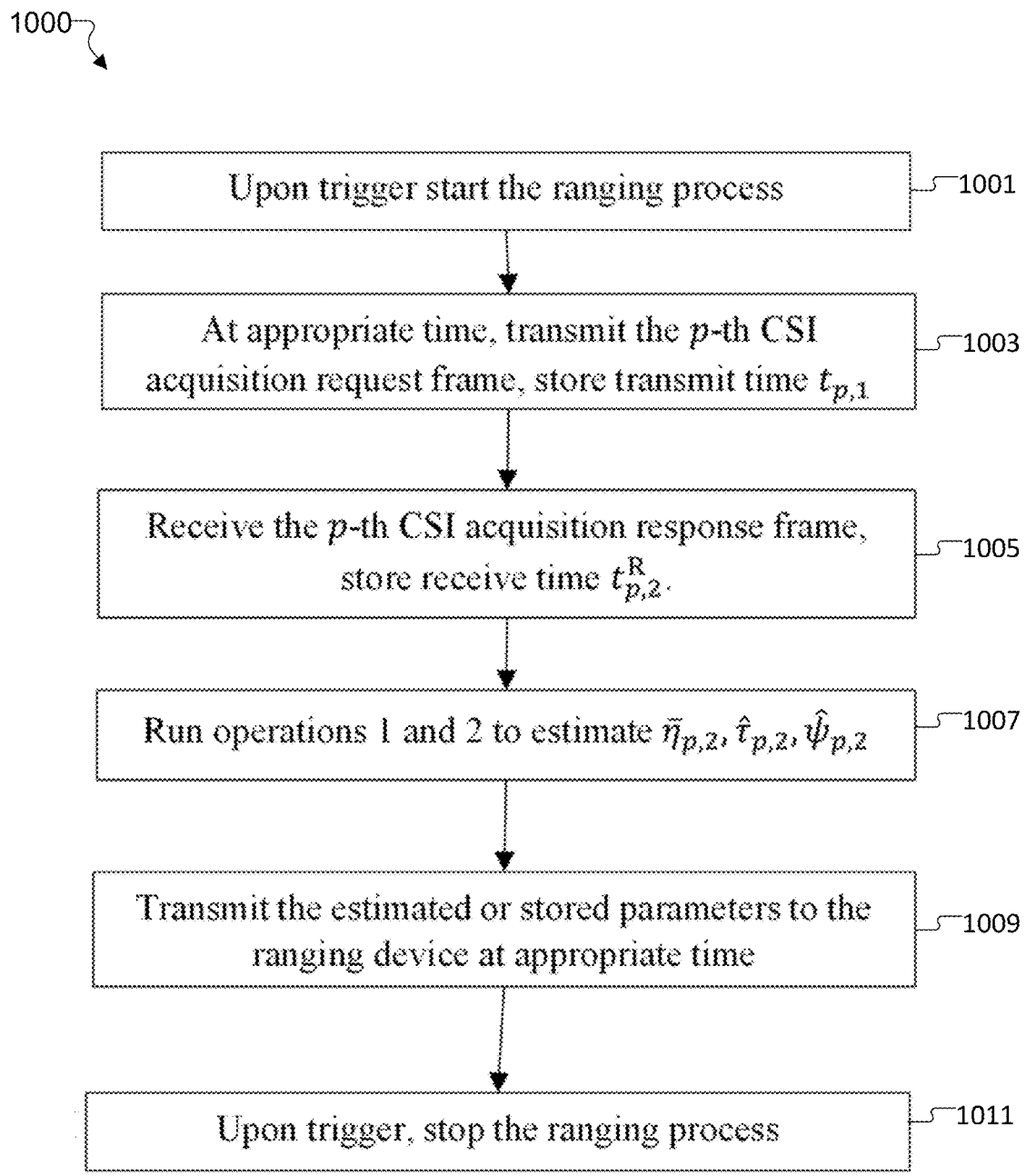
FIG. 10 illustrates a process of an anchor performing Wi-Fi based fine ranging according to various embodiments of the present disclosure.

FIG. 10 illustrates a process 1000 of an anchor 401 performing Wi-Fi based fine ranging according to various embodiments of the present disclosure. At step 1001, the anchor 401 may receive a trigger indicating to start the ranging process 1000. Such a trigger can be sent by the target device 402 or the ranging device, or can be generated from another algorithm within the anchor 401, for example. As an example, the trigger condition can be the RSSI between the target device 402 and anchor 401 being higher than a certain value. At step 1003, upon receiving the trigger, the anchor 401 may start transmitting the CSI acquisition request frames at the appropriate transmission times. At step 1005, for each such request frame, the anchor 401 may receive a CSI acquisition response frame. At step 1007, upon receipt of the CSI acquisition response frame, the anchor 401 may perform Operations 1 and 2 to obtain estimates $\overline{\eta}_{p,2}, \hat{\tau}_{p,2}, \hat{\psi}_{p,2}$. At step 1009, at the appropriate time, some of these estimates along with the time values $t_{p,1}, t_{p,2}^R$ may be transmitted to the ranging device. The anchor 401 may then continue to transmit the following CSI acquisition request frame at the appropriate time. Upon receiving an external trigger, the transmission of the request frames may be halted at step 1011.

Figure 11:
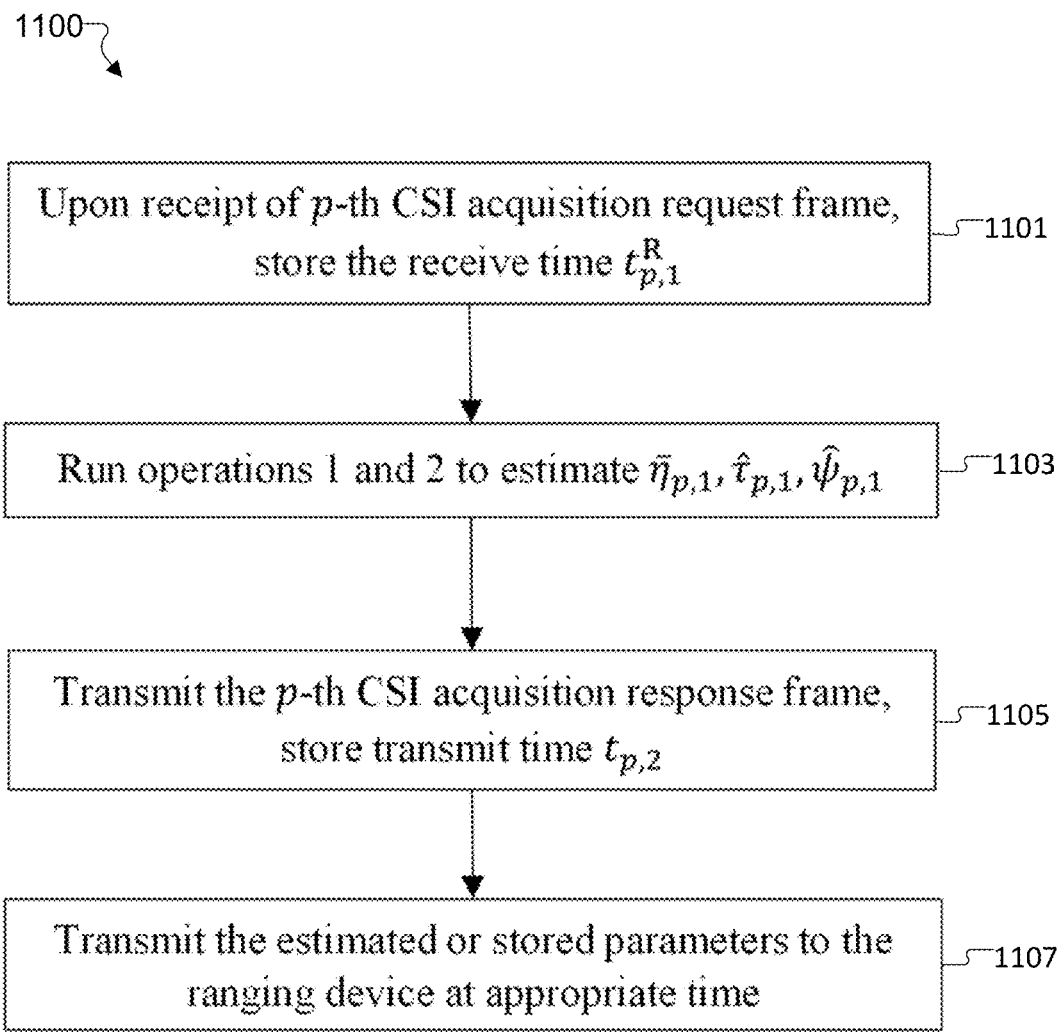
FIG. 11 illustrates a process of a target device performing Wi-Fi based fine ranging according to various embodiments of the present disclosure.

FIG. 11 illustrates a process 1100 of a target device 402 performing Wi-Fi based fine ranging according to various embodiments of the present disclosure. The target device 402 may receive a trigger indicating to start the ranging process 1100. Such a trigger can be sent by the anchor 401 or the ranging device, for example, or can even just be the receipt of a CSI acquisition request frame from the anchor. At step 1101, upon receiving a CSI acquisition request frame, the target device 402 may store the reception time. At step 1103, the target device 402 may use the received CSI acquisition request frame to obtain estimates of $\bar{\eta}_{p,1}$, $\hat{\tau}_{p,1}$, $\hat{\psi}_{p,1}$ using Operations 1 and 2. At step 1105, in response to the CSI acquisition request frame, the target device 402 may also transmit a CSI acquisition response frame. At step 1107, at the appropriate time, some of these estimates $\bar{\eta}_{p,1}$, $\hat{\tau}_{p,1}$, $\hat{\psi}_{p,1}$ along with the time values $t_{p,1}^R$, $t_{p,2}$ may be transmitted to the ranging device. The target device 402 may then continue to wait for future CSI acquisition request frames. Upon receiving an external trigger, it may halt listening for or responding to CSI acquisition request frames.

Figure 12:
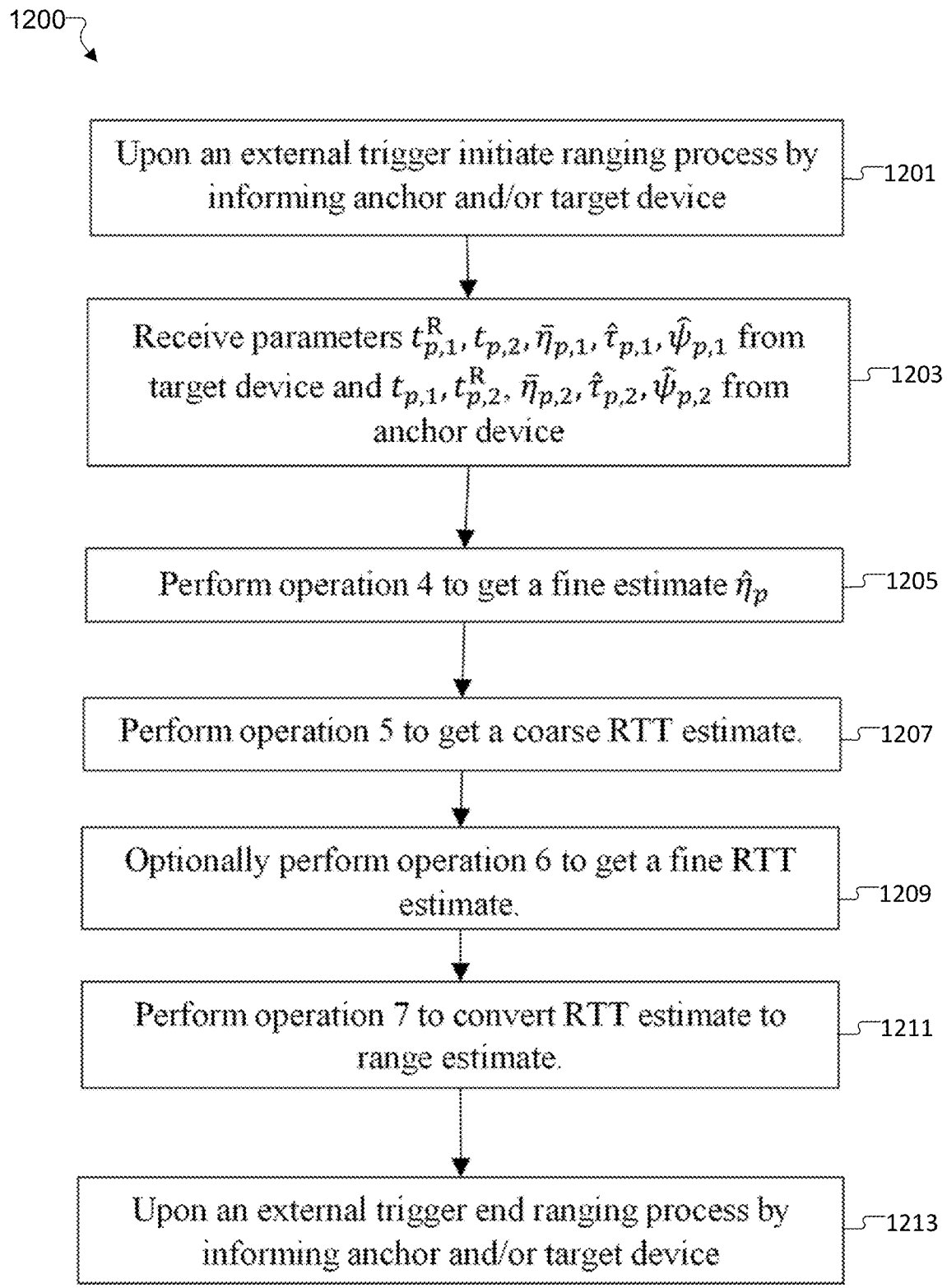
FIG. 12 illustrates a process of a ranging device performing Wi-Fi based fine ranging according to various embodiments of the present disclosure.

FIG. 12 illustrates a process 1200 of a ranging device performing Wi-Fi based fine ranging according to various embodiments of the present disclosure. At step 1201, upon receipt of an external trigger, the ranging device may initiate the ranging process 1200. The trigger may contain an indication for performing carrier-phase based measurement. Upon receipt of the trigger, the ranging device may perform a carrier phase based measurement based on the indication in the trigger. Such a trigger can be some external condition or just the receipt of the CSI acquisition parameters from the anchor 401 and/or the target device 402. The ranging device may further trigger the anchor 401 or the target device 402 to begin the CSI acquisition frame exchanges. At step 1203, the ranging device may obtain some of the estimated and stored parameters $t_{p,1}^R$, $t_{p,2}$, $\bar{\eta}_{p,1}$, $\hat{\tau}_{p,1}$, $\hat{\psi}_{p,1}$ from the target device 402 and $t_{p,1}$, $t_{p,2}^R$, $\bar{\eta}_{p,2}$, $\hat{\tau}_{p,2}$, $\hat{\psi}_{p,2}$ from the anchor 401. It may also obtain identifier information and sequence number information to uniquely identify the device pair and the sequence number of the frame exchange. At step 1205, the ranging device may perform Operation 4 obtain a finer estimate of the crystal offset factor $\hat{\eta}_p$ using the acquired information. At step 1207, the ranging device may perform Operation 5 to get a coarse estimate of the RTT. At step 1209, the ranging device may optionally perform Operation 6 to get a fine estimate of the RTT. For example, the condition to perform fine estimation can be based on the RSSI between the anchor 401 and the target device 402 being above a threshold or there being a strong static path in the CSI measured by either of them or there being a running application that needs the fine RTT estimates. At step 1211, the ranging device may perform Operation 7 to convert the RTT estimate to a range estimate and forward the range information to another application, such as a localization engine. At step 1213, the ranging device may receive an external trigger to stop the ranging process. The ranging device may further trigger the target device 402 or the anchor 401 to stop the CSI acquisition frame exchanges.

Note that although the embodiments above were described assuming that the CSI Acquisition request frame is sent by the anchor 401 and the response is sent by the target device 402, the above embodiments are equally applicable if the CSI acquisition request frame is sent by the target device 402 and the response is then sent by the anchor 401. Thus, this description is only for illustration and should not be construed as a limitation of the current disclosure.

In some embodiments, after Operation 4, the ranging device may only be interested in measuring either of the following:

the differential range $\mathcal{D}_p = \mathcal{A}_p - \mathcal{A}_{p-1}$, which is the change in the absolute range $\mathcal{A}_p$ between adjacent measurements, or the relative range $\mathcal{R}_p = \mathcal{A}_p - \mathcal{A}_1$, which is the change in the absolute range $\mathcal{A}_p$ over an interval of time.

In this case, after Operation 4, the ranging device may directly obtain the sum phase according to the following:

$$\bar{\psi}_p \triangleq N[\hat{\psi}_{p,1} + \hat{\psi}_{p,2} + \hat{\eta}_p 2\pi f_c T_{p,2}^{sw}].$$

These can be used, for example, for direction finding, velocity estimation, gesture recognition, triangulation-based localization, and the like. Additionally, the differential range can be estimated as:

$$\hat{\mathcal{D}}_p = (3 \times 10^8) \frac{\mathrm{mod}\{\bar{\psi}_p - \bar{\psi}_{p-1} + \pi, 2\pi\} - \pi}{4\pi N f_c}.$$

In some embodiments, a motion model can be used for the user to estimate the differential range as:

$$\hat{\mathcal{D}}_p = S_p(t_{p,1} - t_{p-1,1}),$$

where:

$$S_p = \underset{|s| \le S_{max}}{\mathrm{argmax}} \left| \sum_{q \in Q_p} e^{j(\bar{\psi}_p - \bar{\psi}_q)} e^{-\frac{j 4\pi N f_c s[t_{p,1} - t_{q,1}]}{3 \times 10^8}} \right|,$$

and $$Q_p = \{1 \le q \le P \mid |t_{q,1} - t_{p,1}| \le 0.25\}.$$

Finally, the estimate the relative range can be obtained as:

$$\hat{\mathcal{R}}_p = \sum_{q=2}^P (3 \times 10^8) \frac{\mathrm{mod}\{\bar{\psi}_p - \bar{\psi}_{p-1} + \pi, 2\pi\} - \pi}{4\pi N f_c}.$$

Experiments have been performed to test these embodiments. The experiments include both devices exhibiting slow movement (e.g., a speed<50 mm/second) and devices exhibiting fast movement (e.g., a speed>50 mm/second). Results from these experiments show that the disclosed embodiments are capable of providing differential and relative range estimation with mm-level accuracy in WiFi systems by tracking the carrier phase even in multi-path channels.

Although FIGS. 4 through 12 illustrate example techniques for Wi-Fi based fine ranging and related details, various changes may be made to FIGS. 4 through 12. For example, various components in FIGS. 4 through 12 could be combined, further subdivided, or omitted and additional components could be added according to particular needs. In addition, while shown as a series of steps, various operations in FIGS. 4 through 12 could overlap, occur in parallel, occur in a different order, or occur any number of times. In another example, steps may be omitted or replaced by other steps.

Figure 13:
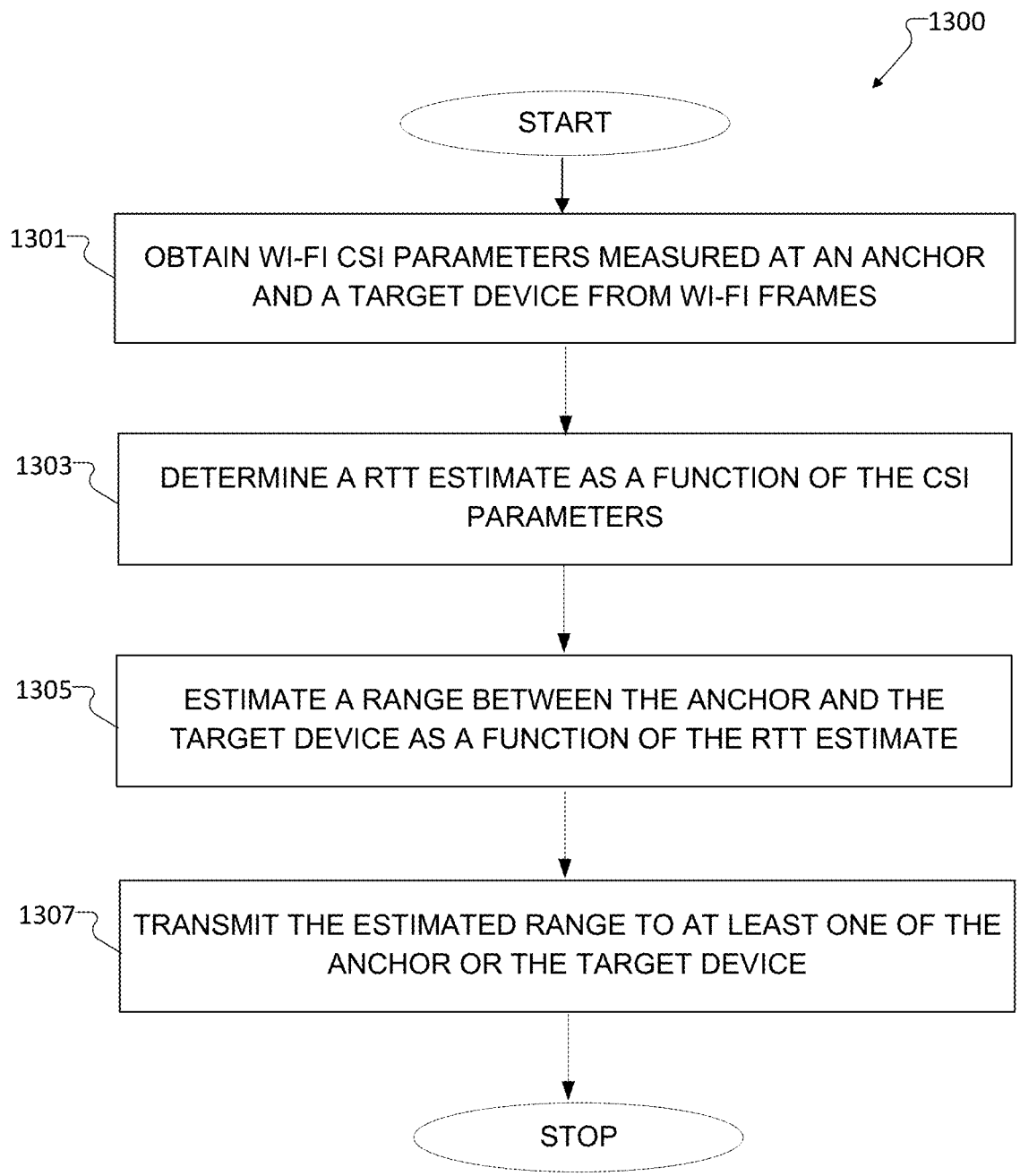
FIG. 13 illustrates a flow chart of a method for Wi-Fi based fine ranging by exploiting carrier phase information according to various embodiments of the present disclosure.

FIG. 13 illustrates a flow chart of a method 1300 for Wi-Fi based fine ranging by exploiting carrier phase information according to various embodiments of the present disclosure, as may be performed by one or more components of the wireless network 100 (e.g., the AP 101 or the STA 111), which may represent an anchor 401, a target device 402, or a separate ranging device. The embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1301. At step 1301, a device obtains Wi-Fi CSI parameters measured at an anchor and a target device from Wi-Fi frames transmitted between the anchor and the target device. The CSI parameters include, for each of the anchor and the target device, frame transmission and reception times, a carrier phase of the CSI, a crystal offset factor, and a packet detection time error. This could include, for example, the STA 111 obtaining Wi-Fi CSI parameters measured at the anchor 401 and the target device 402 from Wi-Fi frames transmitted between the anchor and the target device, such as by performing Operation 1, Operation 2, Operation 3, or a combination of two or more of these.

In some embodiments, each crystal offset factor is estimated based on a carrier frequency offset (CFO) between the target device and the anchor. In some embodiments, each packet detection time error is estimated based on a slope angle of a phase of the CSI as a function of a subcarrier index. In some embodiments, each carrier phase of the CSI is estimated based on a phase of the CSI at a zero subcarrier. In some embodiments, the device performs Operation 4 to increase a precision of the crystal offset factor by using values of carrier phases and corresponding frame transmission and reception times accumulated over a time window.

At step 1303, the device determines a RTT estimate as a function of the CSI parameters. This could include, for example, the STA 111 determining a RTT estimate as a function of the CSI parameters.

In some embodiments, the device determines the RTT estimate by performing Operation 5 to estimate a coarse RTT estimate using the frame transmission and reception times and correcting for the packet detection time error and a crystal offset factor error. In some embodiments, the device further determines the RTT estimate by performing Operation 6 to estimate a relative change in the RTT estimate between adjacent frame exchanges using a sum carrier phase of the CSI, and combine the relative change in the RTT estimate with the coarse RTT estimate to obtain a fine RTT estimate. In some embodiments, the device estimates the relative change in the RTT estimate by estimating a velocity of the target device based on the sum carrier phase of the CSI obtained over the adjacent frame exchanges, and estimating the relative change in the RTT estimate based on the estimated velocity of the target device. In some embodiments, the sum carrier phase of the CSI is estimated by adding the carrier phase of the CSI measured at the anchor and the target device, and removing a component corresponding to the crystal offset factor and the frame transmission and reception times.

At step 1305, the device estimates a range between the anchor and the target device as a function of the RTT estimate. This could include, for example, the STA 111 performing Operation 7 to estimate a range between the anchor 401 and the target device 402 as a function of the RTT estimate. At step 1307, the device transmits the estimated range to at least one of the anchor or the target device. This could include, for example, the STA 111 transmitting the estimated range to the anchor 401, the target device 402, or both.

Although FIG. 13 illustrates one example of a method 1300 for Wi-Fi based fine ranging by exploiting carrier phase information, various changes may be made to FIG. 13. For example, while shown as a series of steps, various steps in FIG. 13 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining Wi-Fi channel state information (CSI) parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error, wherein each crystal offset factor is estimated based on a carrier frequency offset (CFO) between the target device and the anchor;
determining a round trip time (RTT) estimate or a relative change in the RTT estimate as a function of the CSI parameters; and
estimating a range between the anchor and the target device as a function of the RTT estimate, or estimating a change in the range between the anchor and the target device as a function of the relative change in the RTT estimate.

2. The method of claim 1, wherein determining the RTT estimate further comprises:
estimating a coarse RTT estimate using the frame transmission and reception times and correcting for the packet detection time error and a crystal offset factor error; and
combining the relative change in the RTT estimate with the coarse RTT estimate to obtain a fine RTT estimate.

3. The method of claim 1, wherein determining the relative change in the RTT estimate further comprises:
estimating the relative change in the RTT estimate between adjacent frame exchanges using a sum carrier phase of the CSI.

4. The method of claim 3, wherein estimating the relative change in the RTT estimate comprises:
estimating a velocity of the target device based on the sum carrier phase of the CSI obtained over the adjacent frame exchanges; and
estimating the relative change in the RTT estimate based on the estimated velocity of the target device.

5. The method of claim 3, wherein the sum carrier phase of the CSI is estimated by adding the carrier phase of the CSI measured at the anchor and the target device, and removing a component corresponding to the crystal offset factor and the frame transmission and reception times.

6. The method of claim 1, wherein:
each packet detection time error is estimated based on a slope angle of a phase of the CSI as a function of a subcarrier index; and
each carrier phase of the CSI is estimated based on a phase of the CSI at a zero subcarrier.

7. The method of claim 1, further comprising:
increasing a precision of the crystal offset factor by using values of carrier phases and corresponding frame transmission and reception times accumulated over a time window.

8. The method of claim 1, wherein obtaining the CSI parameters comprises one of:
measuring the CSI parameters at the target device and receiving the CSI parameters from the anchor;
measuring the CSI parameters at the anchor and receiving the CSI parameters from the target device; or
receiving the CSI parameters from both the target device and the anchor.

9. The method of claim 1, further comprising:
transmitting the estimated range to at least one of the anchor or the target device.

10. A device comprising:
a transceiver; and
a processor operably connected to the transceiver, the processor configured to:
obtain Wi-Fi channel state information (CSI) parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error, wherein each crystal offset factor is estimated based on a carrier frequency offset (CFO) between the target device and the anchor;
determine a round trip time (RTT) estimate or a relative change in the RTT estimate as a function of the CSI parameters; and
estimate a range between the anchor and the target device as a function of the RTT estimate, or estimate a change in the range between the anchor and the target device as a function of the relative change in the RTT estimate.

11. The device of claim 10, wherein to determine the RTT estimate, the processor is further configured to:
estimate a coarse RTT estimate using the frame transmission and reception times and correct for the packet detection time error and a crystal offset factor error; and
combine the relative change in the RTT estimate with the coarse RTT estimate to obtain a fine RTT estimate.

12. The device of claim 10, wherein to determine the relative change in the RTT estimate, the processor is further configured to:
estimate the relative change in the RTT estimate between adjacent frame exchanges using a sum carrier phase of the CSI.

13. The device of claim 12, wherein to estimate the relative change in the RTT estimate, the processor is configured to:
estimate a velocity of the target device based on the sum carrier phase of the CSI obtained over the adjacent frame exchanges; and
estimate the relative change in the RTT estimate based on the estimated velocity of the target device.

14. The device of claim 12, wherein the processor is configured to estimate the sum carrier phase of the CSI by adding the carrier phase of the CSI measured at the anchor and the target device, and removing a component corresponding to the crystal offset factor and the frame transmission and reception times.

15. The device of claim 10, wherein:
each packet detection time error is estimated based on a slope angle of a phase of the CSI as a function of a subcarrier index; and
each carrier phase of the CSI is estimated based on a phase of the CSI at a zero subcarrier.

16. The device of claim 10, wherein the processor is further configured to:
increase a precision of the crystal offset factor by using values of carrier phases and corresponding frame transmission and reception times accumulated over a time window.

17. The device of claim 10, wherein to obtain the CSI parameters, the processor is configured to perform one of:
measure the CSI parameters at the target device and receive the CSI parameters from the anchor;
measure the CSI parameters at the anchor and receive the CSI parameters from the target device; or
receive the CSI parameters from both the target device and the anchor.

18. The device of claim 10, wherein the processor is further configured to:
transmit the estimated range to at least one of the anchor or the target device.

19. A non-transitory computer readable medium comprising program code that, when executed by a processor of a device, causes the device to:
obtain Wi-Fi channel state information (CSI) parameters measured at an anchor and a target device from Wi-Fi frames transmitted between the anchor and the target device, the CSI parameters comprising, for each of the anchor and the target device, frame transmission and reception times, a carrier phase of the CSI, a crystal offset factor, and a packet detection time error, wherein each crystal offset factor is estimated based on a carrier frequency offset (CFO) between the target device and the anchor;
determine a round trip time (RTT) estimate or a relative change in the RTT estimate as a function of the CSI parameters; and
estimate a range between the anchor and the target device as a function of the RTT estimate, or estimate a change in the range between the anchor and the target device as a function of the relative change in the RTT estimate.

20. The non-transitory computer readable medium of claim 19, wherein the program code to determine the RTT estimate further comprises program code to:
estimate a coarse RTT estimate using the frame transmission and reception times and correct for the packet detection time error and a crystal offset factor error; and
combine the relative change in the RTT estimate with the coarse RTT estimate to obtain a fine RTT estimate.

\* \* \* \* \*